(12) United States Patent
Hasegawa et al.

(10) Patent No.: US 9,587,134 B2
(45) Date of Patent: Mar. 7, 2017

(54) GRAPHENE COMPOSITE AND METHOD OF PRODUCING THE SAME

(71) Applicant: GRAPHENE PLATFORM CORPORATION, Tokyo (JP)

(72) Inventors: Shoji Hasegawa, Tokyo (JP); Nagisa Kamiya, Tokyo (JP)

(73) Assignee: GRAPHENE PLATFORM CORPORATION (JP)

( * ) Notice: Subject to any disclaimer, the term of this patent is extended or adjusted under 35 U.S.C. 154(b) by 39 days.

(21) Appl. No.: 14/973,100

(22) Filed: Dec. 17, 2015

(65) Prior Publication Data

US 2016/0251530 A1 Sep. 1, 2016

Related U.S. Application Data

(60) Continuation of application No. 14/863,233, filed on Sep. 23, 2015, which is a division of application No. 14/651,630, filed as application No. PCT/JP2015/055977 on Feb. 27, 2015.

(30) Foreign Application Priority Data

Jul. 3, 2015 (JP) ................. 2015-533330

(51) Int. Cl.
| | |
|---|---|
| *H01B 1/04* | (2006.01) |
| *C01B 31/04* | (2006.01) |
| *B82Y 30/00* | (2011.01) |
| *C09D 11/52* | (2014.01) |

(52) U.S. Cl.
CPC .................... *C09D 11/52* (2013.01)

(58) Field of Classification Search
CPC ........... H01B 1/04; C01B 31/04; B82Y 30/00; H01M 4/02
USPC .............. 252/500–511; 423/445 R, 448, 460
See application file for complete search history.

(56) References Cited

U.S. PATENT DOCUMENTS

| | | | | |
|---|---|---|---|---|
| 5,700,298 A | * | 12/1997 | Shi ...................... C01B 31/0415 | 204/294 |
| 7,071,258 B1 | | 7/2006 | Jang et al. ..................... 524/496 |
| 2006/0251567 A1 | | 11/2006 | Sung .............................. 423/446 |
| 2010/0147188 A1 | * | 6/2010 | Mamak ................ B82Y 30/00 | 106/31.13 |
| 2011/0200888 A1 | | 8/2011 | Ozaki et al. ................... 429/338 |
| 2012/0070733 A1 | * | 3/2012 | Yamada ................ H01M 4/133 | 429/211 |
| 2012/0077035 A1 | * | 3/2012 | Spahr ...................... C01B 31/04 | 428/402 |
| 2013/0102084 A1 | | 4/2013 | Loh et al. ....................... 436/94 |
| 2013/0270119 A1 | * | 10/2013 | Wada .................. C01B 31/0423 | 205/50 |
| 2015/0073082 A1 | | 3/2015 | Mukohata et al. |
| 2015/0232664 A1 | * | 8/2015 | Guo .......................... C09K 5/14 | 252/75 |
| 2015/0243989 A1 | * | 8/2015 | Yamada ................ H01M 4/587 | 429/231.8 |

FOREIGN PATENT DOCUMENTS

| | | | | |
|---|---|---|---|---|
| CN | 103834235 | | 6/2014 | ............ C09D 11/52 |
| JP | 2000348727 | | 12/2000 | ............ C01B 31/02 |
| JP | 2000348727 A | * | 12/2000 | ............ C01B 31/02 |
| JP | 2011034909 | | 2/2011 | ............ C01B 31/04 |
| JP | 2013077475 | | 4/2013 | ............ H01M 4/62 |
| JP | 2013536141 | | 9/2013 | ............ C01B 31/02 |
| JP | 2014067637 | | 4/2014 | ............ H01M 4/133 |
| JP | 5697067 | | 4/2015 | ............ C01B 31/04 |
| WO | WO 2009/106507 | | 9/2009 | ............ C09C 1/46 |
| WO | WO2011162727 | | 12/2011 | ............ C01B 31/04 |
| WO | WO 2013/146213 | | 10/2013 | ............ C08K 7/00 |
| WO | WO2014036720 A1 | * | 3/2014 | ............ C08K 3/38 |
| WO | WO2014064432 | | 5/2014 | ............ C09D 11/02 |
| WO | WO2014087992 | | 6/2014 | ............ C01B 31/02 |
| WO | WO 2014/144139 | | 9/2014 | ............ B82Y 40/00 |

OTHER PUBLICATIONS

Office Action issued in U.S. Appl. No. 14/863,233, dated Apr. 6, 2016 (26 pgs).
Office Action issued in U.S. Appl. No. 14/973,071, dated Apr. 22, 2016 (17 pgs).
Office Action issued in U.S. Appl. No. 14/863,233, dated Jul. 11, 2016 (15 pgs).
Notice of Allowance issued in U.S. Appl. No. 14/973,071, dated Jul. 15, 2016 (13 pgs).
Taiwan Office Action issued in Taiwan Patent Appln. No. 104142474 dated Feb. 24, 2016, no English translation, (5 pgs).
EPO Communication issued in Appln. No. 15186991.4-1375 dated Mar. 4, 2016 (10 pgs).
Australian Patent Examination Report No. 1 issued in Appln. No. 2015234343, dated Nov. 20, 2015 (2 pgs).
Combined Search and Examination Report issued in GB Appln. No. 1517023.6 dated Jan. 8, 2016 (7 pgs).
Examination Report issued in GB Appln. No. 1517023.6 dated Apr. 11, 2016 (3 pgs).

(Continued)

*Primary Examiner* — Tri V Nguyen
(74) *Attorney, Agent, or Firm* — Hayes Soloway P.C.

(57) ABSTRACT

Provided is a graphite-based carbon material useful as a graphene precursor, from which graphene is easily exfoliated when the graphite-based carbon material is useful as a precursor and from which a highly-concentrated graphene dispersion can easily be obtained. The graphite-based carbon material is a graphite-based carbon material useful as a graphene precursor wherein a Rate (3R) based on an X-ray diffraction method, which is defined by following Equation 1 is 31% or more:

Rate(3R)=P3/(P3+P4)×100   Equation 1 wherein
P3 is a peak intensity of a (101) plane of the rhombohedral graphite layer (3R) based on the X-ray diffraction method, and
P4 is a peak intensity of a (101) plane of the hexagonal graphite layer (2H) based on the X-ray diffraction method.

5 Claims, 19 Drawing Sheets

(56) References Cited

OTHER PUBLICATIONS

Notification of Reasons for Refusal issued in Korean Appln. No. 10-2015-7027688 dated Dec. 9, 2015, with English translation (5 pgs).
Australian Notice of Acceptance issued in application No. 2015203587, dated Oct. 28, 2015 (2 pgs).
Australian Patent Examination Report No. 1, issued in application No. 2015203587, dated Sep. 4, 2015 (2 pgs).
Canadian Examiner Requisition issued in application No. 2,894,774, dated Aug. 14, 2015 (5 pgs).
English translation of the Written Opinion of the International Search Authority issued in corresponding PCT Patent Appln. No. PCT/JP2015/055977 dated May 19, 2015 (5 pgs).
Inagaki et al., "Structural Change of Graphite with Grinding" (with English abstract only) Feb. 1, 1973 (7 pgs).
Japanese Decision to a Grant Patent (with translation) issued in application No. 2015-533330, dated Sep. 8, 2015 (6 pgs).
Japanese Notification of Reason(s) for Refusal issued in application No. 2015-533330, dated Aug. 11, 2015 (6 pgs).
Kawasaki, S., "Classification of solid carbon materials and their structural characteristics" (no translation), Nagoya Institute of Technology (49 pgs), 2011.
Noda et al., "Changes of Probabilities P1, PABA, PABC with Heat Treatment of Carbons" (with English abstract only), Sep. 16, 1966 (10 pgs).
Parthasarathy et al., "Spectroscopic and X-ray diffraction studies on fluid deposited rhombohedral graphite from the Eastern Ghats Mobile Belt, India," Current Science, vol. 90, No. 7, Apr. 10, 2006 (6 pgs).

\* cited by examiner

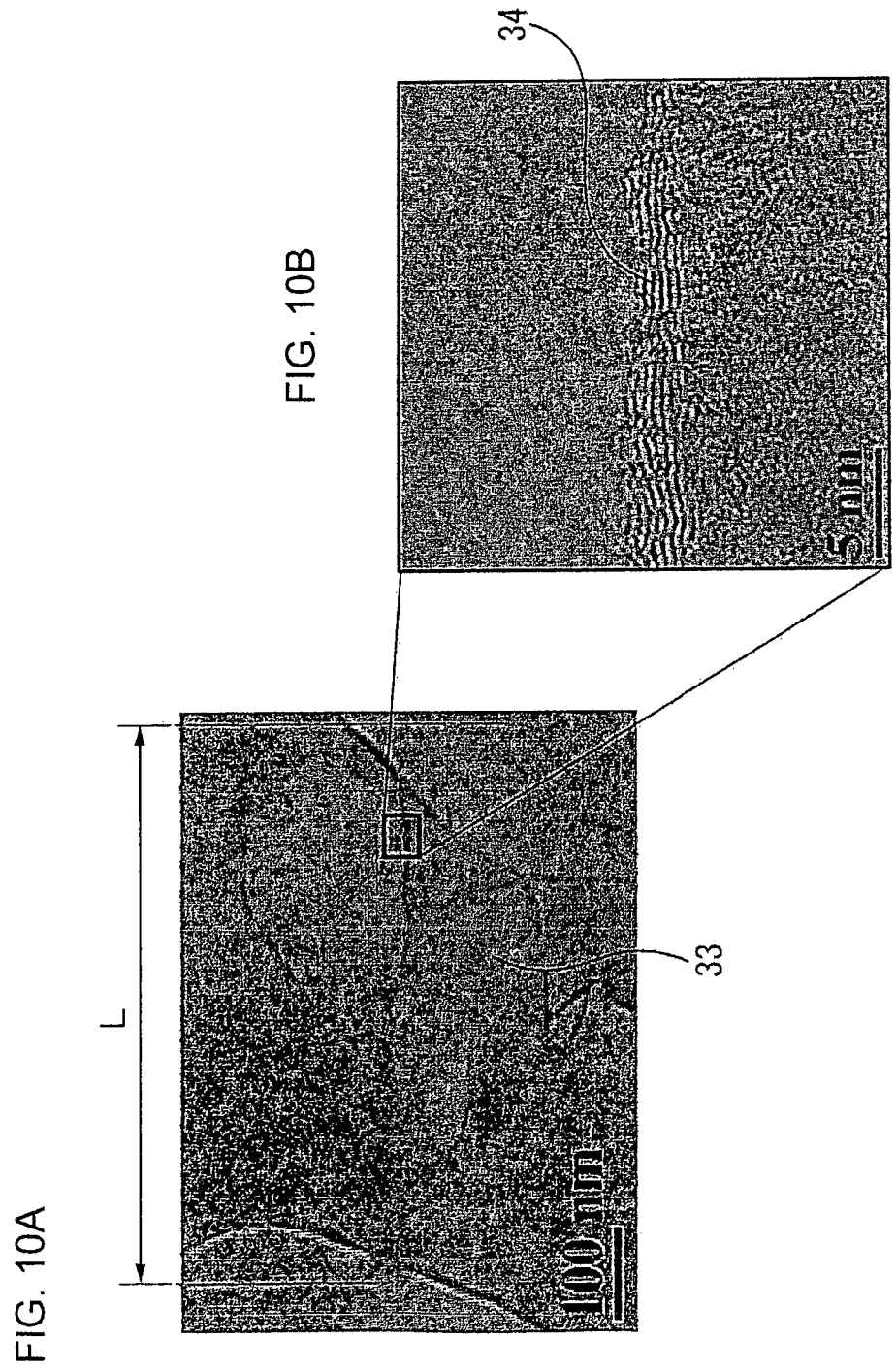

FIG. 13

| Sample No. | 1 | 2 | 3 |
|---|---|---|---|
| Distribution of Number of Layers | (histogram N=36) | (histogram N=51) | (histogram N=50) |
| P3/(P3+P4) | 23% | 31% | 38% |
| 10 layers or less | 10% | 25% | 38% |
| P1/P2 | 0.008 | 0.016 | 0.016 |
| P1 | 120 | 342 | 128 |
| P2 | 15000 | 20993 | 8253 |
| P3 | 50 | 321 | 173 |
| P4 | 160 | 698 | 282 |

| Sample No. | 4 | 5 | 6 | 7 |
|---|---|---|---|---|
| Distribution of Number of Layers | (histogram N=51) | (histogram N=50) | (histogram N=50) | (histogram N=36) |
| P3/(P3+P4) | 42% | 46% | 51% | 58% |
| 10 layers or less | 62% | 68% | 76% | 82% |
| P1/P2 | 0.014 | 0.012 | 0.014 | 0.012 |
| P1 | 253 | 162 | 66 | 151 |
| P2 | 18226 | 13157 | 4675 | 12850 |
| P3 | 320 | 396 | 170 | 452 |
| P4 | 435 | 466 | 162 | 325 |

P3/(P3+P4)=28%
10 layers or less: 25%

P3/(P3+P4)=31%
10 layers or less: 25%

GRAPHENE COMPOSITE AND METHOD OF PRODUCING THE SAME

CROSS REFERENCE TO RELATED APPLICATION

This application is a continuation of U.S. patent application Ser. No. 14/863,233 filed Sep. 23, 2015, which is a divisional of co-pending U.S. patent application Ser. No. 14/651,630, filed Jun. 11, 2015, which is entirely incorporated herein by reference.

TECHNICAL FIELD

The present invention relates to a graphene composite using a graphene precursor and a method of producing the same.

BACKGROUND ART

In recent years, addition of various nanomaterials has been studied for purposes of downsizing and weight saving in various fields. In particular, for problems of environments or resources, carbon materials such as graphene, CNT (carbon nanotube) and fullerene have attracted attention as nonmetal nanomaterials.

For example, although carbon black has been used as a conductive assistant for lithium-ion batteries and the like, carbon nanofiber VGCF (registered trademark) manufactured by Showa Denko K.K., etc. have been studied in recent years to further secure conductivity (Patent Literature 1).

Among them, graphene is superior to other carbon materials in aspect of mass productivity, handleability, etc., as well as performance, and expectations have been placed on graphene in various fields.

In order to obtain high-quality graphene which, for example, has fewer graphite layers, a method in which weak ultrasonic waves are applied to natural graphite in a solvent (NMP) for a long time (7-10 hours), large agglomerates which deposit on the bottom are then removed, and the supernatant is then centrifuged to concentrate it, thereby obtaining a graphene dispersion in which 20% or more of flakes of a single layer, 40% or more of flakes of double or triple layers, and less than 40% of flakes of 10 layers or more of a graphite material are dispersed at about 0.5 g/L, has been considered (Patent Literature 2).

CITATION LIST

Patent Literature

PTL 1: JP-A-2013-77475 (Paragraph 0023)
PTL 2: WO 2014/064432 (lines 4-9 on page 19)

Non Patent Literature

NPL 1: Structural Change of Graphite Caused by Grinding; authors: Michio INAGAKI, Hisae MUGISHIMA, and Kenji HOSOKAWA; Feb. 1, 1973 (Received)
NPL 2: Changes of Probabilities P1, PABA, PABC with Heat Treatment of Carbons; authors: Tokiti NODA, Masaaki IWATSUKI, and Michio INAGAKI; Sep. 16, 1966 (Received)
NPL 3: Spectroscopic and X-ray diffraction studies on fluid deposited rhombohedral graphite from the Eastern Ghats Mobile Belt, India; G. Parthasarathy, Current Science, Vol. 90, No. 7, 10 Apr. 2006
NPL 4: Classification of solid carbon materials and their structural characteristics; Nagoya Institute of Technology; Shinji KAWASAKI

SUMMARY OF INVENTION

Technical Problem

However, even when the graphite material (20% or more of flakes of a single layer, 40% or more of flakes of double or triple layers, and less than 40% of flakes of 10 layers or more) obtained by the method disclosed in Patent Literature 2 was mixed into a solvent, the amount of graphene dispersed in the solvent was small, and only a dilute graphene dispersion could be obtained. Additionally, although it is considered that a supernatant is collected and concentrated, it takes a long time for treatments to repeat the steps of collecting and concentrating the supernatant, and there is a problem of inferior production efficiency of a graphene dispersion. As disclosed in Patent Literature 2, even by subjecting natural graphite to an ultrasonic treatment for a long time, only weak parts of the surface are exfoliated, other large parts do not contribute to the exfoliation, and it is considered as a problem that the amount of exfoliated graphene is small.

The invention was completed focusing on such problem points, and a graphite-based carbon material, from which graphene is easily exfoliated by carrying out predetermined treatments to natural graphite, and which makes it possible to disperse graphene at a high concentration or to a high degree is called a graphene precursor. Then, an object of the invention is to provide a graphite-based carbon material useful as such a graphene precursor, as well as a method of producing the same.

Solution to Problem

In order to solve the above-mentioned problems, a graphene composite of the present invention comprises at least a graphene is partially exfoliated from the graphite-based carbon material and dispersed in a base material, the graphite-based carbon material having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1, is 31% or more:

$$\mathrm{Rate}(3R) = P3/(P3+P4) \times 100 \quad \text{(Equation 1)}$$

wherein
P3 is a peak intensity of a (101) plane of the rhombohedral graphite layer (3R) based on the X-ray diffraction method, and
P4 is a peak intensity of a (101) plane of the hexagonal graphite layer (2H) based on the X-ray diffraction method,
the graphene being a crystal of a mean size of 100 nm or more and formed in a flake-like or sheet-like shape having 10 layers or less.

Accordingly, the graphene is highly dispersed in the graphene composite, whereby properties of the graphene composite are improved.

Further, the graphene composite is used as a resin molded article. As a result, the strength of the resin molded article is improved by dispersing graphene therein.

Further, the base material is a resin and a compatibilizer is dispersed in the base material. As a result, the graphene is easily exfoliated by the action of the compatibilizer and the strength of the resin molded article is further improved.

Further, the graphene composite is used as conductive ink. As a result, conductivity of the conductive ink is improved by dispersing graphene therein.

Further, the base material is at least one of a solvent and a conductivity-imparting agent. As a result, the conductive ink is excellent in conductivity.

Further, a method of producing a graphene composite comprises a step of mixing at least a graphite-based carbon material in a base material, wherein graphene is partially exfoliated from the graphite-based carbon material and dispersed in the base material, the graphite-based carbon material having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1, is 31% or more:

$$Rate(3R)=P3/(P3+P4)\times 100 \quad \text{(Equation 1)}$$

wherein

P3 is a peak intensity of a (101) plane of the rhombohedral graphite layer (3R) based on the X-ray diffraction method, and P4 is a peak intensity of a (101) plane of the hexagonal graphite layer (2H) based on the X-ray diffraction method, the graphene being a crystal of a mean size of 100 nm or more and formed in a flake-like or sheet-like shape having 10 layers or less.

Accordingly, the graphene is highly dispersed in the graphene composite, whereby properties of the graphene composite are improved.

Further, the base material is a resin, the mixing step involves kneading while applying shearing force, and the graphene composite is a resin molded article. As a result, the graphene is easily exfoliated in the graphene composite and the graphene composite having improved strength can be obtained.

Further, a compatibilizer is added and kneaded in the base material in the mixing step. As a result, the graphene is easily exfoliated by the action of the compatibilizer and the resin molded article excellent in strength can be obtained.

Further the graphene composite is conductive ink. As a result, the conductive ink having improved conductivity can be obtained by dispersing graphene therein.

Further, the base material is at least one of a solvent and a conductivity-imparting agent. As a result, the conductive ink having improved conductivity can be easily obtained.

Further, the graphite-based carbon material useful as a graphene precursor of the invention is characterized by having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$Rate(3R)=P3/(P3+P4)\times 100 \quad \text{(Equation 1)}$$

wherein

P3 is a peak intensity of a (101) plane of the rhombohedral graphite layer (3R) based on the X-ray diffraction method, and P4 is a peak intensity of a (101) plane of the hexagonal graphite layer (2H) based on the X-ray diffraction method.

According to the features, since a large amount of the rhombohedral graphite layer (3R) from which a layer is easily exfoliated is included therein, a graphite-based carbon material useful as a graphene precursor, from which graphene is easily exfoliated when the graphite-based carbon material is useful as a precursor, and which makes it possible to disperse graphene at a high concentration or to a high degree can be obtained.

The graphite-based carbon material useful as a graphene precursor of the invention is characterized in that the Rate (3R) is 40% or more.

According to the feature, as long as the Rate (3R) is 40% or more, a graphite-based carbon material useful as a graphene precursor from which graphene is more easily exfoliated, compared with cases where the Rate (3R) is 31% or more and less than 40%, can easily be obtained.

The graphite-based carbon material useful as a graphene precursor of the invention is characterized in that the Rate (3R) is 50% or more.

According to the feature, as long as the Rate (3R) is 50% or more, a graphite-based carbon material useful as a graphene precursor from which graphene is more easily exfoliated, compared with cases where the Rate (3R) is 40% or more and less than 50%, can easily be obtained.

The graphite-based carbon material useful as a graphene precursor of the invention is characterized in that an intensity ratio P1/P2 of the hexagonal graphite layer (2H) based on the X-ray diffraction method is 0.01 or more, wherein P1 is a peak intensity of a (100) plane of the hexagonal graphite layer (2H) based on the X-ray diffraction method, and P2 is a peak intensity of a (002) plane of the hexagonal graphite layer (2H) based on the X-ray diffraction method.

According to the feature, when the intensity ratio P1/P2 of the hexagonal graphite layer (2H) is made 0.01 or more, the orientation disorder of crystal structure of carbon material will be higher, graphene is easily exfoliated, and the graphite-based carbon material can be made to more effectively function as the precursor.

The above-described graphite-based carbon material useful as a graphene precursor is characterized in that the graphite-based carbon material is produced by carrying out a radiowave-force-based treatment and a physical-force-based treatment in a vacuum or in the air.

According to the feature, by combining a treatment based on a radiowave force by microwaves, millimeter waves, plasma, electromagnetic induction heating (IH), magnetic fields or the like, and a treatment based on a physical force by a ball mill, jet mill, centrifugal force, supercriticality or the like, to a natural graphite material in a vacuum or in the air, a graphite-based carbon material including more rhombohedral graphite layers (3R) is obtained. In addition, since the treatments are carried out in a vacuum or in the air, after treatments are simple.

A method of producing a graphite-based carbon material useful as a graphene precursor of the invention is characterized by including: carrying out a radiowave-force-based treatment and a physical-force-based treatment to a natural graphite material in a vacuum or in the air.

According to the feature, by combining a treatment based on a radiowave force by microwaves, millimeter waves, plasma, electromagnetic induction heating (IH), magnetic fields or the like, and a treatment based on a physical force by a ball mill, a jet mill, a centrifugal force, supercriticality or the like, a graphite-based carbon material useful as a graphene precursor, which more easily separates into graphene, compared with use of either one of the treatments, can be obtained in a short time.

A method of producing a graphite-based carbon material useful as a graphene precursor of the invention is characterized in that the above-described natural graphite material has at least a hexagonal graphite layer (2H), and an intensity ratio P1/P2 of the hexagonal graphite layer (2H) based on the X-ray diffraction method is less than 0.01, wherein P1 is a peak intensity of a (100) plane of the hexagonal graphite layer (2H) based on the X-ray diffraction method, and P2 is a peak intensity of a (002) plane of the hexagonal graphite layer (2H) based on the X-ray diffraction method.

According to the features, the carbon material can be produced from easily-available natural graphite of which the orientation disorder of crystal structure of carbon material is lower and general.

The graphite-based carbon material of the invention is characterized by having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$Rate(3R)=P3/(P3+P4)\times100 \qquad \text{(Equation 1)}$$

wherein

P3 is a peak intensity of a (101) plane of the rhombohedral graphite layer (3R) based on the X-ray diffraction method, and P4 is a peak intensity of a (101) plane of the hexagonal graphite layer (2H) based on the X-ray diffraction method.

According to the features, the graphite-based carbon material that contains a large amount of the rhombohedral graphite layer (3R) which is easily exfoliated to layers can be obtained.

Furthermore other aspects are following.

A graphene dispersion is characterized in that the graphene dispersion is obtained by carrying out a radiowave-force-based treatment and a physical-force-based treatment to the above-described graphite-based carbon material useful as a graphene precursor in a liquid.

According to the feature, in a liquid such as a solvent, heat acts on the graphite-based carbon material due to the radiowave force by microwaves, millimeter waves, plasma, electromagnetic induction heating (IH), magnetic fields or the like, and a physical force further acts thereon by a ball mill, a jet mill, a centrifugal force, supercriticality or the like. Therefore, by combining the radiowave-force-based treatment and the physical-force-based treatment, a large amount of graphene is easily exfoliated in a short time, a graphite-based carbon material from which graphene is not exfoliated and which remains in the liquid as a solvent is less, and graphene is highly dispersed therein. Consequently, a large amount of graphene can be dispersed in the liquid such as a solvent, and a concentrated graphene dispersion is obtained.

The graphene dispersion is characterized by containing at least 0.01 or more parts by weight of graphene.

According to this feature, when at least 0.01 or more parts by weight of graphene is present, the graphene has high dispersibility, and therefore, functions caused by dispersions of the graphene can sufficiently be exerted.

A graphene composite is characterized in that the graphene composite is obtained by mixing the above-described graphite-based carbon material useful as a graphene precursor or the above-described graphene dispersion with a composite base material, followed by kneading them while applying a shearing force to them.

According to the feature, the above-described graphite-based carbon material or the above-described graphene dispersion and the composite base material are kneaded while applying a shearing force to them, and therefore, graphene is easily exfoliated therefrom, and exfoliated graphene is highly dispersed therein. Consequently, a graphene composite, which can disperse a large amount of graphene in a composite base material such as monomers, polymers, other carbon materials, ceramics, wood, cements, or metals, is obtained.

The graphene composite is characterized in that a compatibilizer is used in kneading the graphene precursor or the graphene dispersion with the composite base material.

According to the feature, due to effects of the compatibilizer, graphene is more easily exfoliated.

The graphene dispersion is characterized in that, when 0.1 part by weight of the above-described graphite-based carbon material useful as a graphene precursor is mixed with N-methylpyrrolidone (NMP), and an ultrasonic wave with an output of 100 W and with a frequency of 20 kHz is applied to the resulting mixture for 3 hours to thereby disperse graphene, 50% or more of an amount of graphene each having 10 layers or less are exposed relative to a total amount of all graphene and graphene precursors.

According to the feature, by only carrying out the above-described treatments to 0.1 part by weight of the graphite-based carbon material useful as a graphene precursor, a graphene dispersion in which graphene is dispersed at a high concentration or to a high degree, such that the amount of graphene each having 10 layers or less is 50% or more relative to a total amount of all graphene and graphene precursors, can be obtained.

A graphite-based carbon material useful as a graphene precursor is characterized in that the graphite-based carbon material used with kneading a composite base material.

According to the feature, a shearing force is applied to the graphite-based carbon material with kneading them, and therefore, graphene is easily exfoliated therefrom, and exfoliated graphene is highly dispersed therein. Consequently, a graphene composite, which can disperse a large amount of graphene in a composite base material such as monomers, polymers, other carbon materials, ceramics, wood, cements, or metals, is obtained.

The graphene in a composite base material is characterized in that the composite base material is a resin.

According to the feature, a resin molded article having a high degree dispersed graphene can be obtained. For example, a resin molded article having an excellent elastic modulus can be obtained.

BRIEF DESCRIPTION OF DRAWINGS

FIG. 4(a) is a diagram which illustrates a pulverizing state, and FIG. 4(b) is a diagram which illustrates a state where graphite-based carbon materials (precursors) are collected.

FIGS. 10(a) and 10(b) are TEM images of a graphite-based carbon material (graphene) dispersed in a dispersion.

FIG. 11(a) is a diagram which shows an average size distribution, while FIG. 11(b) is a diagram which shows a distribution of the number of layers.

FIG. 12(a) is a diagram showing an average size distribution, and FIG. 12(b) is a diagram showing a distribution of the number of layers.

FIG. 13 is a diagram which shows distributions of the number of layers of graphite-based carbon materials each dispersed in dispersions that were produced using Samples 1 to 7 as precursors.

FIG. 15(a) is a diagram showing a distribution in a case where an ultrasonic treatment and a microwave treatment were combined, while FIG. 15(b) is a diagram showing a distribution of the number of layers in a case where an ultrasonic treatment was conducted.

FIG. 19(a) is a dispersing state of sample 12, and FIG. 19(b) is a dispersing state of sample 2.

DESCRIPTION OF EMBODIMENTS

Figure 1A:
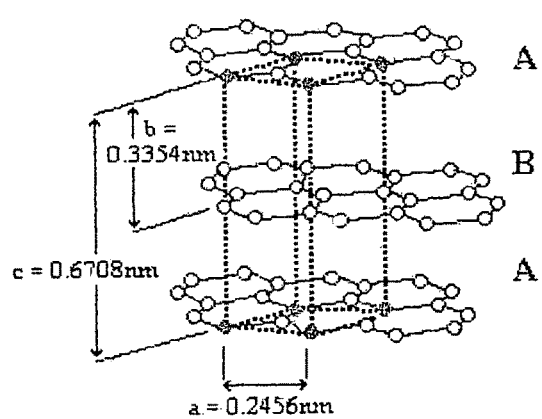
FIGS. 1(a) and 1(b) are figures which show a crystal structure of graphite, where FIG. 1(a) refers to a crystal structure of hexagonal crystals, and FIG. 1(b) refers to a crystal structure of rhombohedral crystals.
Figure 1B:
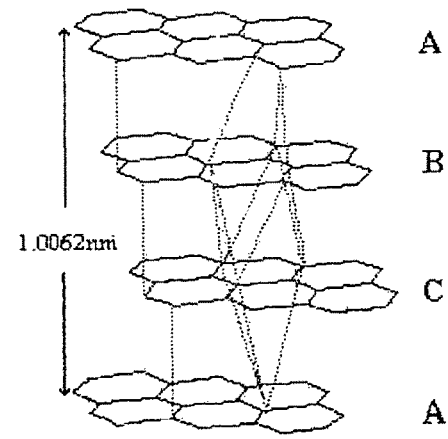

The invention focuses on a crystal structure of graphite, and, at first, matters relating to the crystal structure will be explained. It has been known that natural graphite is classified into three types of crystal structures, namely hexagonal crystals, rhombohedral crystals and disordered crystals, depending on an overlapping manner of layers. As shown in FIGS. 1 (a) and 1(b), hexagonal crystals have a crystal structure in which layers are arranged in the order of ABABAB . . . , while rhombohedral crystals have a crystal structure in which layers are arranged in the order of ABCABCABC . . . .

In natural graphite, there are almost no rhombohedral crystals in a stage where natural graphite is excavated. However, about 14% of rhombohedral crystals exist in general natural graphite-based carbon materials because pulverization or the like is carried out in a purification stage. In addition, it has been known that a proportion of rhombohedral crystals converges on about 30% even when pulverization is carried out during purification for a long time (Non-Patent Literatures 1 and 2).

Moreover, a method in which graphite is expanded by heating, rather than with physical forces such as pulverization, thereby flaking the graphite. However, even when graphite is treated with a heat of 1600 K (about 1,300° C.), a proportion of rhombohedral crystals is about 25% (Non-Patent Literature 3). Furthermore, the proportion is up to about 30% even when heat of an extremely high temperature of 3000° C. is applied thereto (Non-Patent Literature 2).

Thus, although it is possible to increase a proportion of rhombohedral crystals by treating natural graphite with physical forces or heat, the upper limit is about 30%.

Hexagonal crystals (2H), which are included in natural graphite at a high level, are very stable, and an interlayer van der Waals' force between their graphene layers is shown by Equation 3 (Patent Literature 2). By applying an energy exceeding this force, graphene is exfoliated. An energy required for the exfoliation is inversely proportional to the cube of the thickness. Therefore, in a thick state where numerous layers are overlapped, graphene is exfoliated by a weak physical force such as by very feeble ultrasonic waves. However, in a case where graphene is exfoliated from somewhat thin graphite, a very large energy is required. In other words, even if graphite is treated for a long time, only weak parts of the surface are exfoliated, and large parts remain not exfoliated.

$$Fvdw = H \cdot A / (6\pi \cdot t^3) \qquad \text{Equation 3}$$

Fvdw: Van der Waals' force
H: Hamaker constant
A: Surface area of graphite or graphene
t: Thickness of graphite or graphene The present inventors succeeded in increasing a proportion of rhombohedral crystals (3R), which had been increased to only about 30% by treatments of pulverization or heating to an extremely high temperature, to 30% or more by carrying out predetermined treatments, as shown below, to natural graphite. The following findings were obtained as results of experiments and studies. That is, when a content of rhombohedral crystals (3R) in a graphite-based carbon material is higher, particularly when the content is 31% or more, there is a tendency that graphene is easily exfoliated by use of such a graphite-based carbon material as a precursor, thereby easily obtaining a highly concentrated and dispersed graphene dispersion or the like. For the reason, it is considered that, when a shear force or the like is applied to rhombohedral crystals (3R), a deformation occurs between layers, i.e. a deformation in the entire structure of the graphite becomes large, and graphene is easily exfoliated independently of the van der Waals' force. Accordingly, in the invention, a graphite-based carbon material, from which graphene is easily exfoliated by carrying out predetermined treatments to natural graphite, and which makes it possible to disperse graphene at a high concentration or to a high degree, is called a graphene precursor. Hereinafter, a method of producing a graphene precursor showing predetermined treatments, a crystal structure of the graphene precursor, and a graphene dispersion using the graphene precursor will be described in that order in examples below.

Here, in the specification, a graphene refers to a flake-like or sheet-like graphene which is a crystal of a mean size of 100 nm or more but which is not a fine crystal of a mean size of several nanometers to tens of nanometers, and which has 10 layers or less.

Additionally, since graphene is a crystal with a mean size of 100 nm or more, when artificial graphite and carbon black, which are amorphous (microcrystal) carbon materials other than natural graphite, are even treated, graphene cannot be obtained (Non-Patent Literature 4).

Further, in the specification, a graphene composite means a composite which is produced by using the graphite-based carbon material useful as a graphene precursor according to the invention, i.e. a graphite-based carbon material having a Rate (3R) of 31% or more (e.g. Samples 2-7 of Example 1, samples 2, 21, . . . of Example 5 described below).

Hereinafter, examples for carrying out the graphene composite using the graphene precursor and the method of producing the same, according to the present invention, will be described.

Example 1

As to Production of a Graphite-Based Carbon Material Useful as a Graphene Precursor A method for obtaining a graphite-based carbon material useful as a graphene precursor by a production apparatus A using a jet mill and plasma shown in FIG. 3 will be explained. As an example, the production apparatus A refers to a case in which plasma is applied for the radiowave-force-based treatment and in which the jet mill is used for the physical-force-based treatment.

Figure 3:
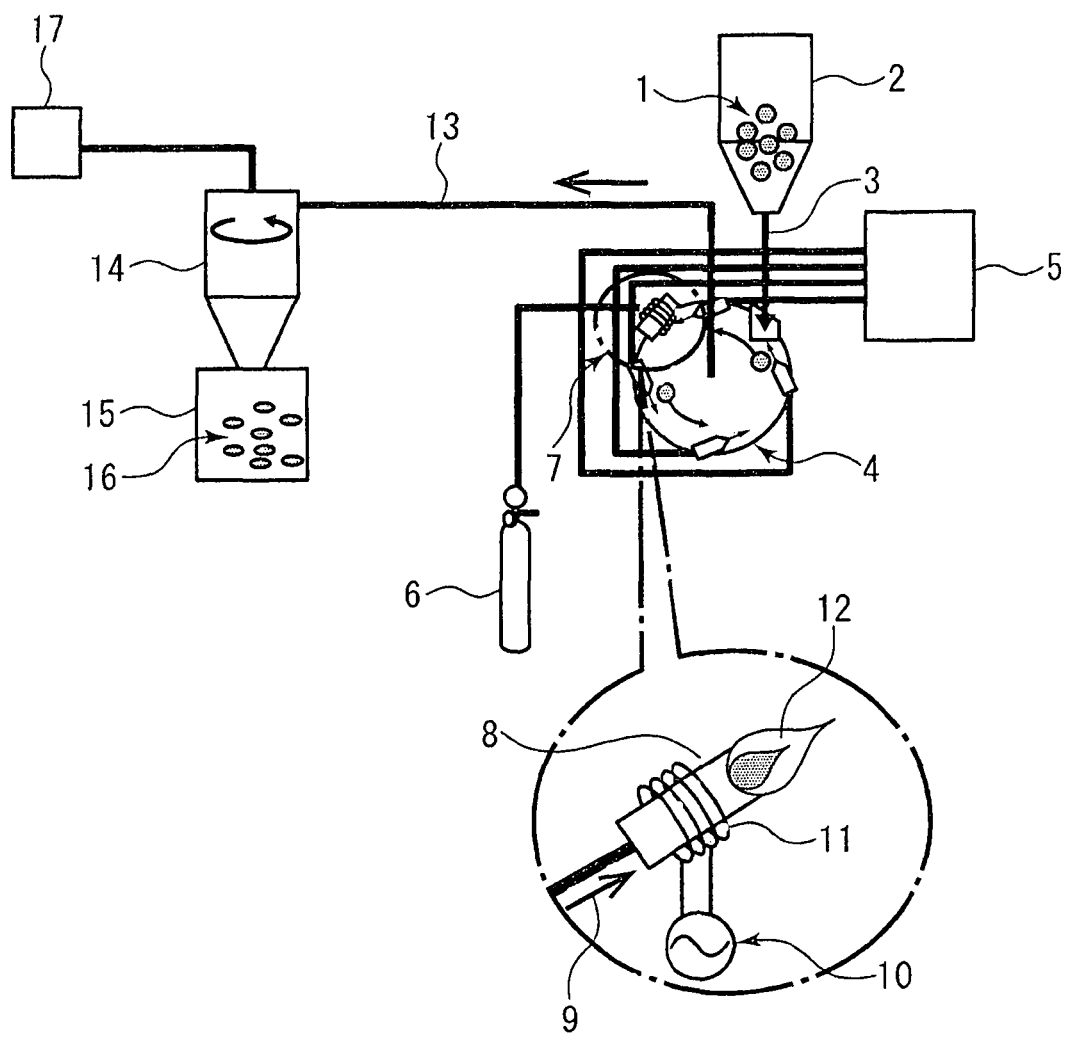
FIG. 3 is a diagram which illustrates a production apparatus A using a jet mill and plasma of Example 1.

In FIG. 3, the symbol 1 refers to a particle of 5 mm or less of a natural graphite material (flaky graphite ACB-50 manufactured by Nippon Graphite Industries, ltd.); the symbol 2 refers to a hopper which stores the natural graphite material 1; the symbol 3 refers to a Venturi nozzle which discharges the natural graphite material 1 from the hopper 2; the symbol 4 refers to a jet mill which jets the air which has been pumped from a compressor 5, while being divided into eight places, to thereby allow the natural graphite material to collide against the inside of a chamber by a jet blast; and the symbol 7 refers to a plasma generator which sprays a gas 9, such as oxygen, argon, nitrogen or hydrogen, through a nozzle 8 from a tank 6 and which applies a voltage to a coil 11, wound around the outer periphery of the nozzle 8, from a high-voltage power supply 10, thereby generating plasma inside the chamber of the jet mill 4, and the plasma generator is provided in each of four places inside the chamber. The symbol 13 refers to a pipe which connects the jet mill 4 and a dust collector 14 to one another; the symbol 14 refers to a dust collector; the symbol 15 refers to a collection container; the symbol 16 refers to a graphite-based carbon material (graphene precursor); and the symbol 17 refers to a blower.

Next, the production method will be explained. Conditions for the jet mill and plasma are as follows.
The conditions for the jet mill are as follows.
Pressure: 0.5 MPa
Air volume: 2.8 m$^3$/min
Nozzle inner Diameter: 12 mm
Flow rate: about 410 m/s
The conditions for plasma are as follows.
Output: 15 W
Voltage: 8 kV
Gas species: Ar (purity 99.999 vol %)
Gas flow rate: 5 L/min It is considered that the natural graphite materials 1, which have been charged into the chamber of the jet mill 4 from the Venturi nozzle 3, are accelerated to the sonic velocity or higher inside the chamber, and are pulverized by impact between the natural graphite materials 1 or by impact of them against the wall, and that, simultaneously, the plasma 12 discharges an electric current or excites the natural graphite materials 1, acts directly on atoms (electrons), and increases deformations of crystals, thereby promoting the pulverization. When the natural graphite materials 1 turn into fine particles of a certain particle diameter (about 1 to 10 μm), their mass is reduced, the centrifugal force is weakened, and, consequently, the natural graphite materials 1 are pumped out from the pipe 13 which is connected to the center of the chamber.

A gas including graphite-based carbon materials (graphene precursors), which have been flowed from the pipe 13 into a cylindrical container of the chamber of the dust collector 14, forms a spiral flow, and drops the graphite-based carbon materials 16, which collide with the internal wall of the container, to a collection container 15 below, while an ascending air current generates in the center of the chamber due to a tapered container part of the downside of the chamber, and the gas is emitted from the blower 17 (so-called cyclone effects). According to the production apparatus A in this example, about 800 g of a graphene precursor from 1 kg of the raw materials, i.e. natural graphite materials 1, is used. The graphite-based carbon material (graphene precursors) 16 was obtained (recovery efficiency: about 80%).

Next, based on the production apparatus B using a ball mill and microwaves shown in FIGS. 4(a) and 4(b), a method for obtaining a graphite-based carbon material useful as a graphene precursor will be described. The apparatus B refers to, as an example, a case where microwaves are applied as the radiowave-force-based treatment and where a ball mill is used for the physical-force-based treatment.

Figure 4A:
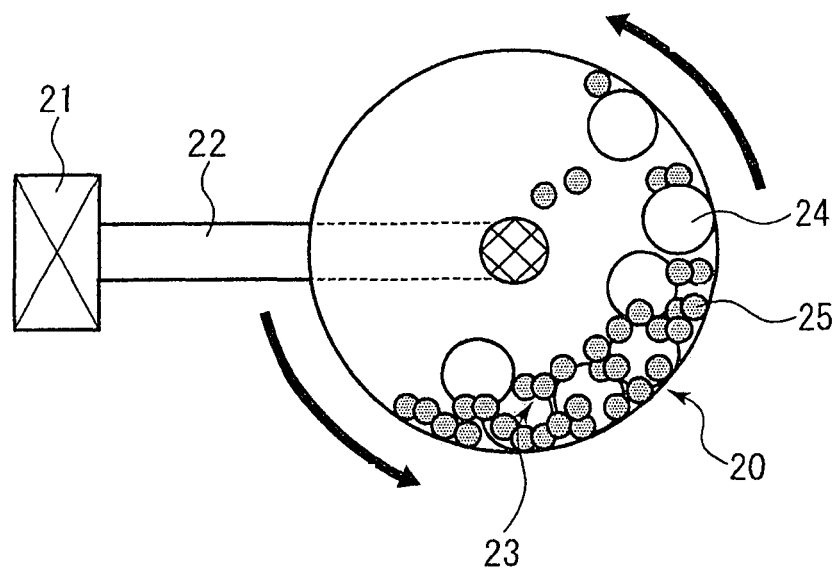
FIGS. 4(a) and 4(b) are figures which illustrate a production apparatus B using a ball mill and magnetron of Example 1, where
Figure 4B:
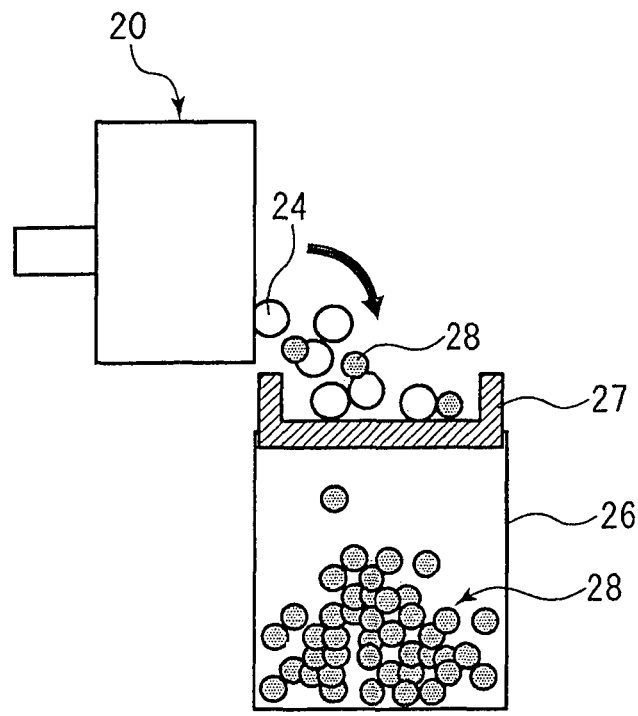

In FIGS. 4(a) and 4(b), the symbol 20 refers to the ball mill; the symbol 21 refers to a microwave generator (magnetron); the symbol 22 refers to a wave guide; the symbol 23 refers to a microwave inlet; the symbol 24 refers to a media; the symbol 25 refers to particles of 5 mm or less of a natural graphite material (flaky graphite ACB-50 manufactured by Nippon Graphite Industries, ltd.); the symbol 26 refers to a collection container; the symbol 27 refers to a filter; and the symbol 28 refers to graphite-based carbon material (graphene precursors).

Next, the production method will be explained. Conditions for the ball mill and the microwave generator are as follows.
The conditions for the ball mill are as follows.
Rotational speed: 30 rpm
Media size: ϕ5 mm
Media species: zirconia balls
Pulverization time: 3 hours The conditions for the microwave generator (magnetron) are as follows.
 Output: 300 W
 Frequency: 2.45 GHz
 Irradiation method: Intermittent 1 kg of natural graphite carbon raw materials 25 and 800 g of media 24 are charged into the chamber of the ball mill 20, the chamber is closed, and the mixture is treated at a rotational speed of 30 rpm for 3 hours. During the treatment, microwaves are irradiated intermittently (for 20 seconds every 10 minutes) to the chamber. It is considered that the microwave irradiation acts directly on atoms (electrons) of the raw materials, thus increasing deformations of the crystals. After the treatment, media 24 are removed by the filter 27, and thus, powder of about 10 μm of graphite-based carbon materials (precursors) 28 can be collected in the collection container 26.

<As to an X-Ray Diffraction Profile of Graphite-Based Carbon Materials (Graphene Precursors)>

Figure 5:
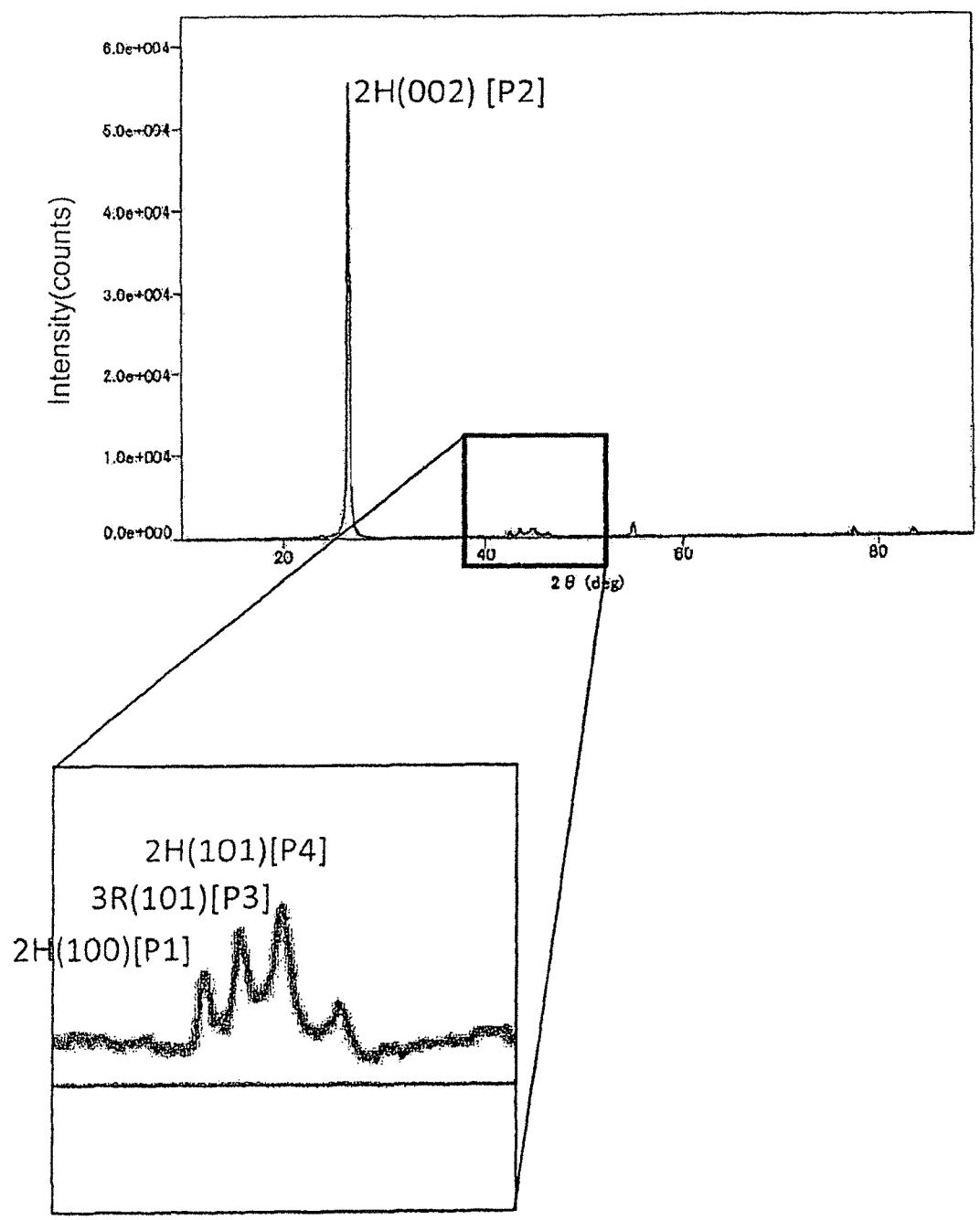
FIG. 5 is a diagram which shows an X-ray diffraction profile of a graphite-based carbon material of Sample 5 produced by the production apparatus B according to Example 1.
Figure 6:
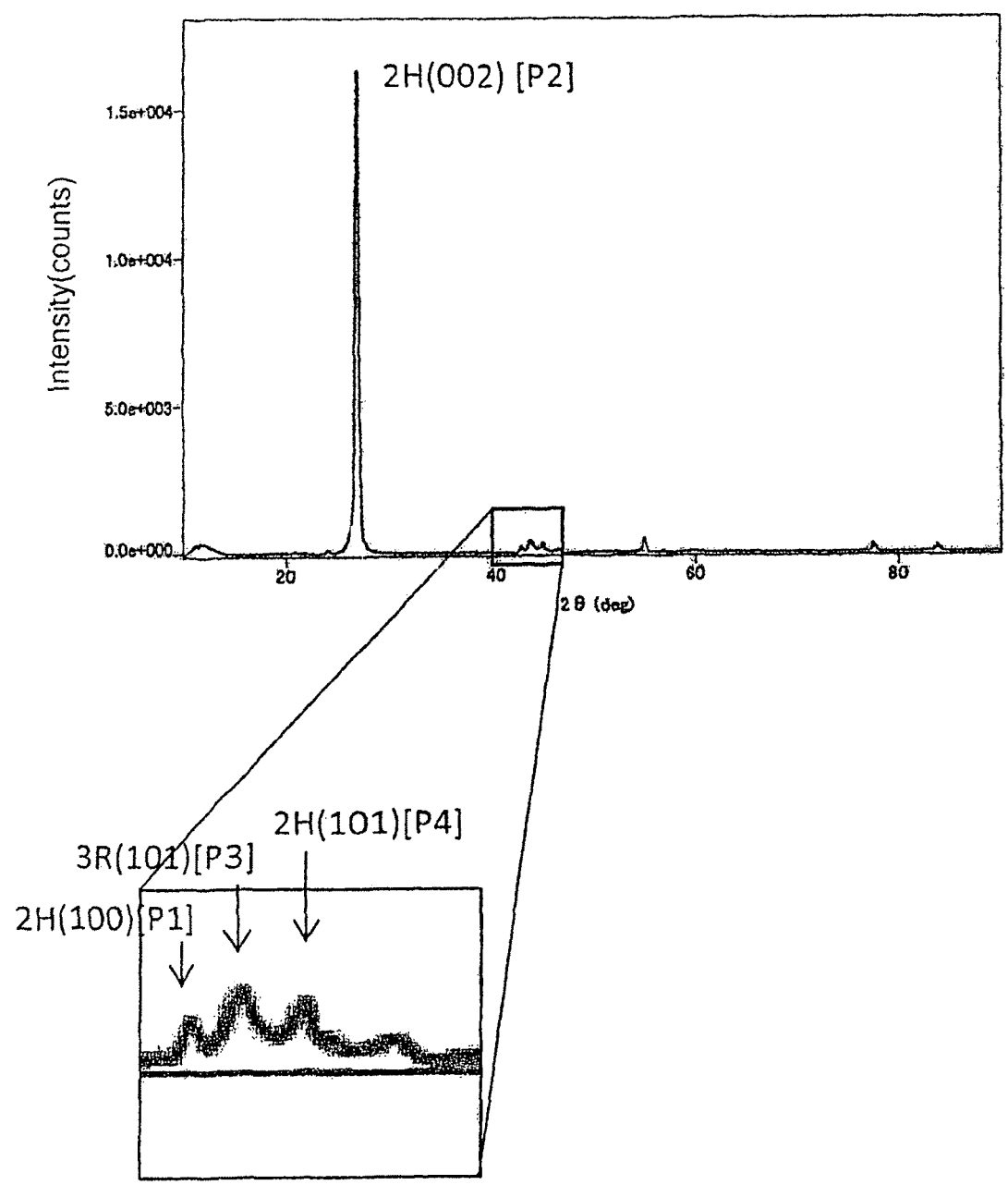
FIG. 6 is a diagram which shows an X-ray diffraction profile of a graphite-based carbon material of Sample 6 produced by the production apparatus A according to Example 1.
Figure 7:
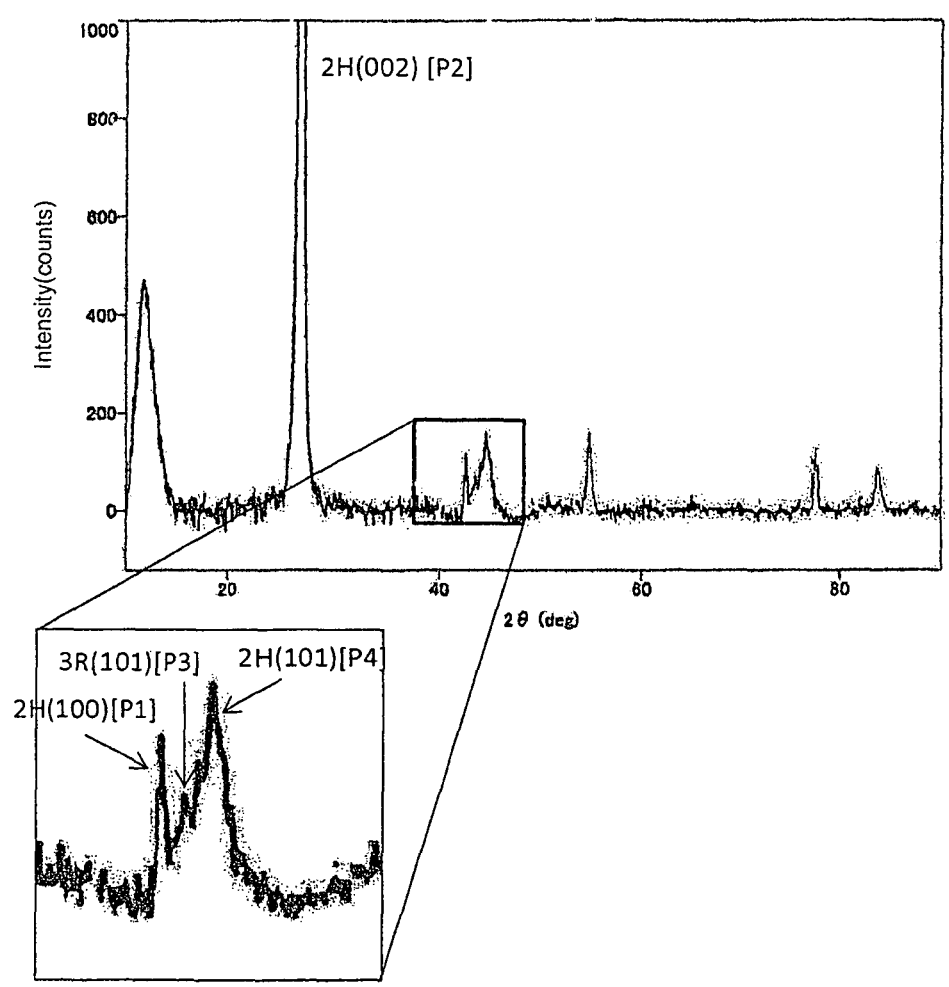
FIG. 7 is a diagram which shows an X-ray diffraction profile of a graphite-based carbon material of Sample 1 indicating a comparative example.

With reference to FIGS. 5 to 7, X-ray diffraction profiles and crystal structures will be described with respect to graphite-based natural materials (Samples 6 and 5) produced by the production apparatuses A and B, and the powder of about 10 μm of graphite-based natural materials (Sample 1: a comparative example) obtained by using only the ball mill of the production apparatus B.

The measurement conditions for the X-ray diffraction apparatus are as follows.
 Source: Cu Kα ray
 Scanning speed: 20°/min
 Tube voltage 40 kV
 Tube current: 30 mA According to the X-ray diffraction method (horizontal-sample-mounting-model multi-purpose X-ray diffractometer Ultima IV manufactured by Rigaku Corporation), each sample shows peak intensities P1, P2, P3 and P4 in the planes (100), (002) and (101) of hexagonal crystals 2H and in the plane (101) of rhombohedral crystals 3R. Therefore, these peak intensities will be explained.

Here, the measurements of X-ray diffraction profile have been used the so-called standardized values at home and abroad in recent years. This horizontal-sample-mounting-model multi-purpose X-ray diffractometer Ultima IV manufactured by Rigaku Corporation is an apparatus which can measure X-ray diffraction profile in accordance with JIS R 7651:2007 "Measurement of lattice parameters and crystallite sizes of carbon materials". In addition, Rate (3R) is the ratio of the diffraction intensity obtained by the Rate (3R)= P3/(P3+P4)×100, even if the value of the diffraction intensity is changed, the value of Rate (3R) is not changes. Means that the ratio of the diffraction intensity is standardized, it is commonly used to avoid performing the identification of the absolute value substance and its value does not depend on measurement devices.

As shown in FIG. 5 and Table 1, Sample 5 produced by the production apparatus B, which applies a treatment with a ball mill and a microwave treatment, had high rates of peak intensities P3 and P1, and a Rate (3R) defined by Equation 1 showing a rate of P3 to a sum of P3 and P4 was 46%. Additionally, the intensity ratio P1/P2 was 0.012.

$$\text{Rate}(3R)=P3/(P3+P4)\times 100 \quad \text{(Equation 1)}$$

wherein
 P1 is a peak intensity of a (100) plane of the hexagonal graphite layer (2H) based on the X-ray diffraction method,
 P2 is a peak intensity of a (002) plane of the hexagonal graphite layer (2H) based on the X-ray diffraction method,
 P3 is a peak intensity of a (101) plane of the rhombohedral graphite layer (3R) based on the X-ray diffraction method, and
 P4 is a peak intensity of a (101) plane of the hexagonal graphite layer (2H) based on the X-ray diffraction method.

TABLE 1

|  | Peak intensities [counts · deg] (2θ[°]) |
|---|---|
| Hexagonal crystals 2H (100) [P1] | 162 (42.33) |
| Hexagonal crystals 2H (002) [P2] | 13157 (26.50) |
| Rhombohedral crystals 3R (101) [P3] | 396 (43.34) |
| Hexagonal crystals 2H (101) [P4] | 466 (44.57) |

In the same manner, as shown in FIG. 6 and Table 2, Sample 6 produced by the production apparatus A, which applies a treatment based on the jet mill and a treatment based on plasma, had high rates of peak intensities P3 and P1, and the Rate (3R) was 51%. In addition, the intensity ratio P1/P2 was 0.014.

TABLE 2

|  | Peak intensities [counts · deg] (2θ[°]) |
|---|---|
| Hexagonal crystals 2H (100) [P1] | 66 (42.43) |
| Hexagonal crystals 2H (002) [P2] | 4,675 (26.49) |
| Rhombohedral crystals 3R (101) [P3] | 170 (43.37) |
| Hexagonal crystals 2H (101) [P4] | 162 (44.63) |

Furthermore, as shown in FIG. 7 and Table 3, Sample 1 indicating a comparative example produced with only the ball mill had a small rate of a peak intensity P3, compared with Samples 5 and 6, and the Rate (3R) was 23%. In addition, the intensity ratio P1/P2 was 0.008.

TABLE 3

|  | Peak intensities [counts · deg] (2θ[°]) |
|---|---|
| Hexagonal crystals 2H (100) [P1] | 120 (42.4) |
| Hexagonal crystals 2H (002) [P2] | 15,000 (26.5) |
| Rhombohedral crystals 3R (101) [P3] | 50 (43.3) |
| Hexagonal crystals 2H (101) [P4] | 160 (44.5) |

Figure 2:
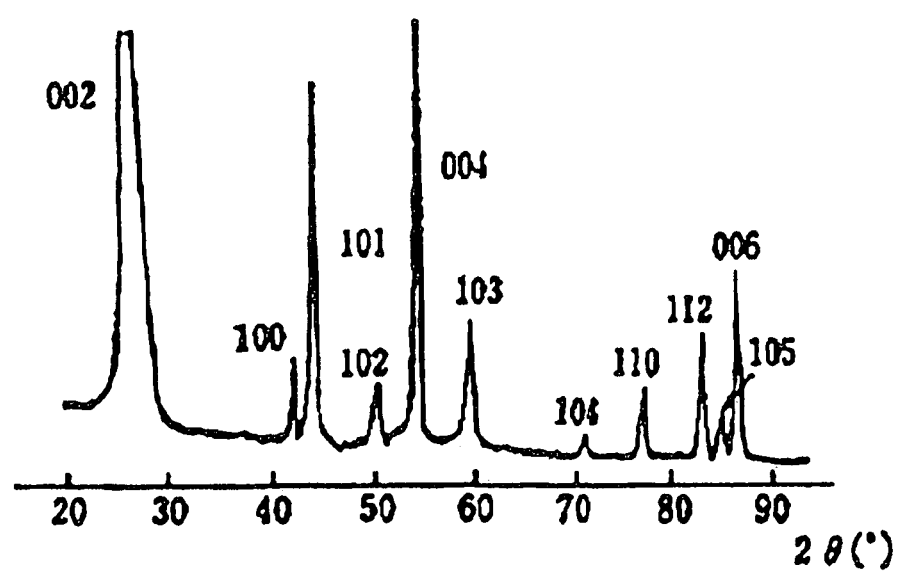
FIG. 2 is a diagram which shows an X-ray diffraction profile of general natural graphite.

Thus, Sample 5 produced by the production apparatus B of Example 1, and Sample 6 produced by the production apparatus A of Example 1 had Rates (3R) of 46% and 51%, respectively, and it was shown that their Rates (3R) were 40% or more, or 50% or more, compared with the natural graphite shown in FIG. 2 and Sample 1 indicating a comparative example.

Next, graphene dispersions were produced using the above-produced graphene precursors, and their easiness in exfoliation of graphene was evaluated.

<As to Graphene Dispersions>

Figure 8:
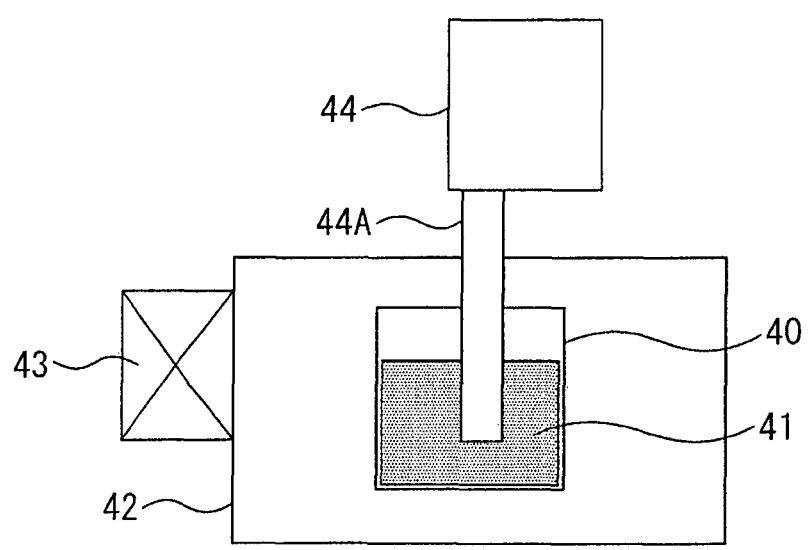
FIG. 8 is a diagram which shows a dispersion-producing apparatus which produces a dispersion using a graphite-based carbon material as a precursor.

A method for producing a graphene dispersion will be explained with reference to FIG. 8. FIG. 8 shows, as an example, a case where an ultrasonic treatment and a microwave treatment are combined in a liquid when a graphene dispersion is produced.

(1) 0.2 g of a graphite-based carbon material useful as a graphene precursor and 200 ml of N-methylpyrrolidone (NMP) which serves as dispersing medium are charged to a beaker 40.

(2) The beaker 40 is put into a chamber 42 of a microwave generator 43, and an ultrasonic trembler 44A of an ultrasonic horn 44 is inserted into dispersing medium 41 from the upper direction.

(3) The ultrasonic horn 44 is activated, and ultrasonic waves of 20 kHz (100 W) are continuously applied thereto for 3 hours.

(4) While the above ultrasonic horn 44 is actuated, the microwave generator 43 is activated to apply microwaves of 2.45 GHz (300 W) intermittently (irradiation for 10 seconds every 5 minutes) thereto.

Figure 9:
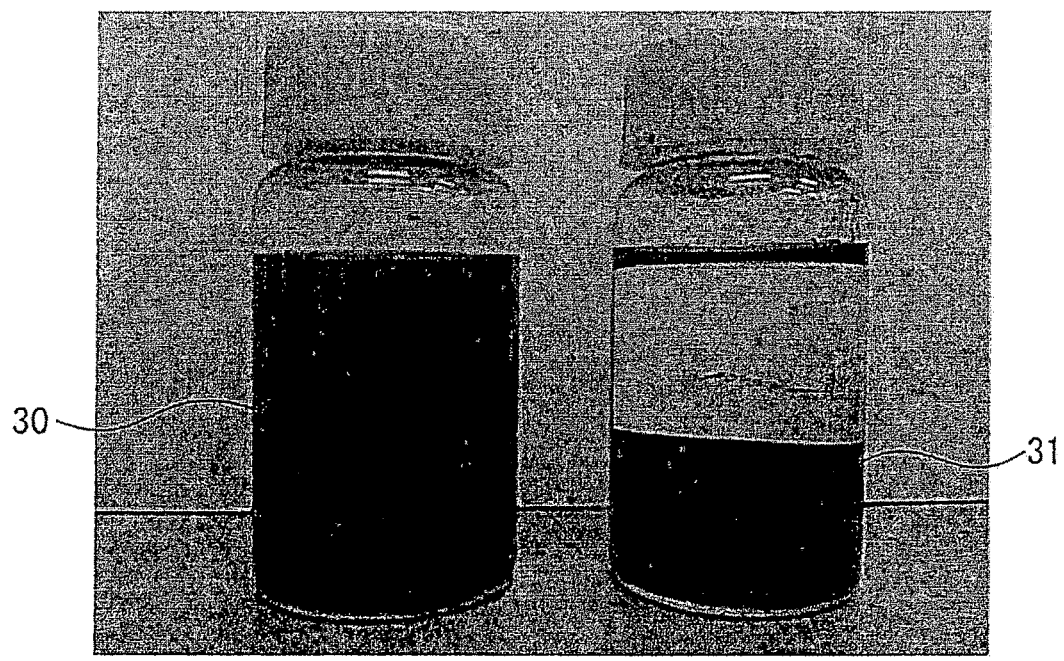
FIG. 9 is a diagram which shows dispersing states of dispersions produced by using graphite-based carbon materials of Sample 1 indicating a comparative example, and Sample 5 produced by the production apparatus B of Example 1.

FIG. 9 refers to appearances of graphene dispersions produced in the above-described way when 24 hours had passed.

Although a portion of the graphene dispersion 30 using Sample 5 produced by the production apparatus B was deposited, a product entirely showing a black color was observed. For this, it is considered that a large portion of the graphite-based carbon materials used as graphene precursors are dispersed in a state where graphene is exfoliated from them.

In the dispersion 31 using Sample 1 indicating a comparative example, most of the graphite-based carbon materials were deposited, and it was confirmed that a portion thereof floated as a supernatant. From the facts, it is considered that graphene was exfoliated from a small portion thereof and that they floated as the supernatant.

Furthermore, the graphene dispersion produced in the above-described way was diluted to an observable concentration, was coated onto a sample stage (TEM grid), and the grid was dried. Thus, the size and the number of layers of graphene was observed in the captured image of a transmission electron microscope (TEM), as shown in FIGS. 10(a) and 10(b). In addition, the grid coated with the diluted supernatant was used for Sample 1. For example, in the case of FIGS. 10(a) and 10(b), the size corresponds to a maximum length L of a flake 33, which was 600 nm, based on FIG. 10 (a). As for the number of layers, the end face of the flake 33 was observed in FIG. 10 (b), and overlapping graphene layers were counted, thereby calculating the number of layers as 6 layers (a portion indicated by the symbol 34). In this way, the size and the number of layers were measured with respect to each flake ("N" indicates the number of flakes), and the numbers of graphene layers and the sizes shown in FIGS. 11 and 12 were obtained.

Figure 11A:
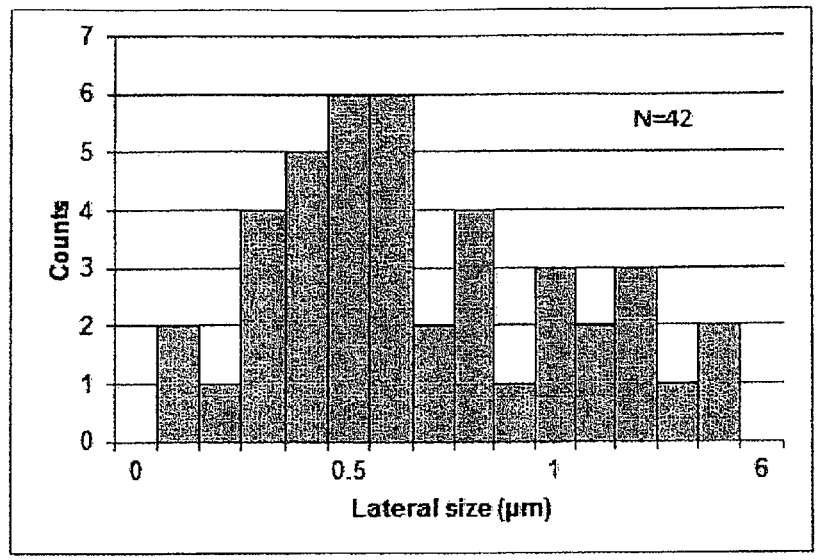
FIGS. 11(a) and 11(b) are figures which show distribution states of a graphite-based carbon material dispersed in a dispersion which was produced using a graphite-based carbon material (precursor) of Sample 5, where
Figure 11B:
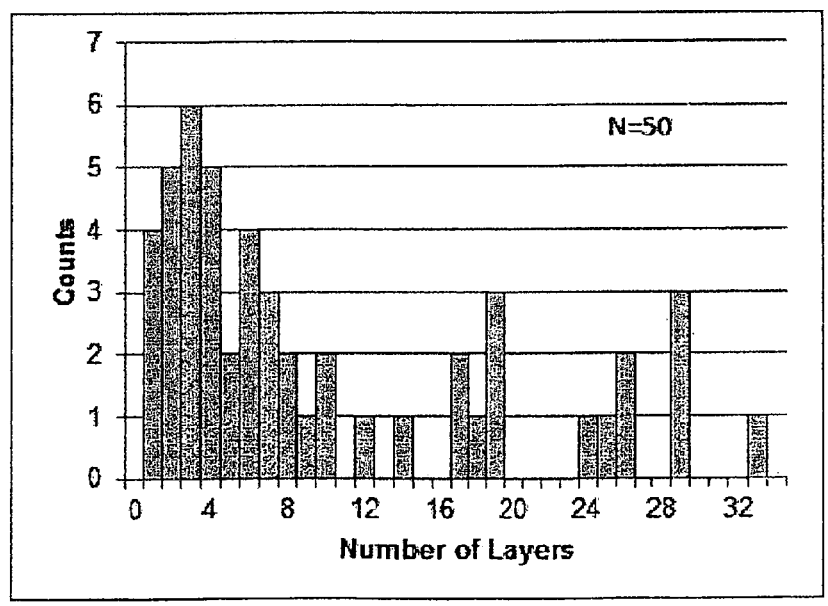

With reference to FIG. 11 (a), a particle size distribution (distribution of sizes) of thin flakes included in the graphene dispersion of Sample 5 (Rate (R3) of 46%) produced by the production apparatus B of Example 1 was a distribution having a peak of 0.5 μm. In addition, in FIG. 11 (b), as to the number of layers, a distribution which had a peak in 3 layers and in which graphene having 10 layers or less were 68% was observed.

Figure 12A:
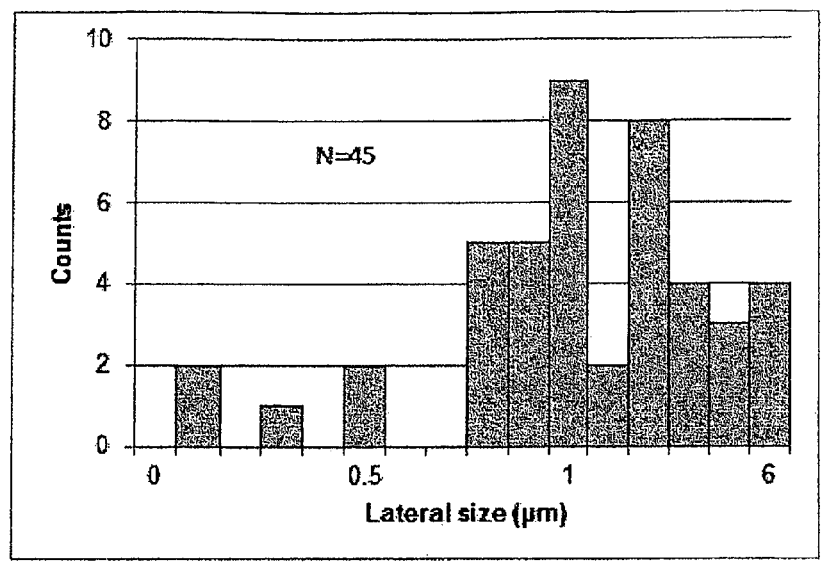
FIGS. 12(a) and 12(b) are figures which show a distribution state of a graphite-based carbon material dispersed in a dispersion which was produced using a graphite-based carbon material of Sample 1 indicating the comparative example, where
Figure 12B:
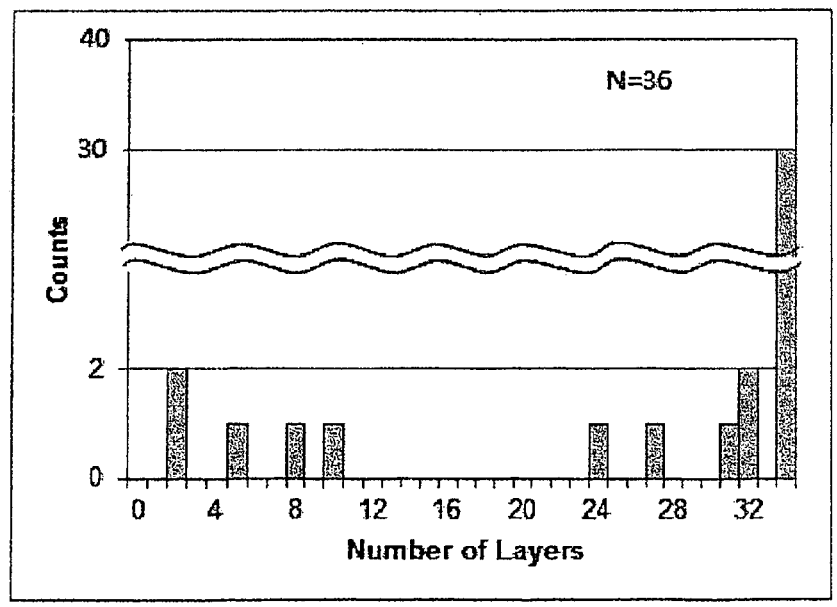

With reference to FIGS. 12(a) and 12(b), a particle size distribution (distribution of sizes) of thin flakes included in the dispersion of Sample 1 (Rate (R3) of 23%) of the comparative example was a distribution having a peak of 0.9 μm. In addition, as for the number of layers, a distribution in which those having 30 layers or more occupied the greater portion and in which graphene having 10 layers or less were 10% was observed.

From the results, it was revealed that, when the product of Sample 5 produced by the production apparatus B was used as a graphene precursor, a highly-concentrated graphene dispersion which contains plenty of graphene of 10 layers or less and which has excellent dispersibility of graphene can be obtained.

Next, with reference to FIG. 13, a relation between the Rate (3R) of the graphene precursor and the number of layers in the graphene dispersion will be described. Samples 1, 5 and 6 in FIG. 13 are those described above. Samples 2, 3 and 4 were produced by the production apparatus B which carried out a treatment based on a ball mill and a microwave treatment, and were graphene dispersions produced using graphene precursors which had been produced by making the irradiating time of microwaves shorter than that for Sample 5. In addition, Sample 7 was produced by the production apparatus A which carried out a treatment based on a jet mill and a plasma treatment, and was a graphene dispersion produced by using a graphene precursor which had been produced by applying plasma of a higher output than that for Sample 6.

From FIG. 13, as to Samples 2 and 3 showing Rates (3R) of 31% and 38%, respectively, the distributions of the number of layers have peaks at around 13 as the number of layers; that is, the shapes of the distributions are close to that of a normal distribution (dispersions using Samples 2 and 3). As to Samples 4 to 7 showing Rates (3R) of 40% or more, the distributions of the number of layers have peaks at several as the number of layers (thin graphene); that is, the shapes of the distributions are those of a so-called log normal distribution. On the other hand, as to Sample 1 having a Rate (3R) of 23%, the distribution thereof has a peak at 30 or more as the number of layers (a dispersion using Sample 1). That is, it is understood as follows: there is a tendency that, in cases where the Rate (3R) reaches 31% or more, the shapes of the layer number distributions differ from those for cases where the Rate (3R) is less than 31%; and further, in cases where the Rate (3R) reaches 40% or more, the shapes of the layer number distributions clearly differ from those for cases where the Rate (3R) is less than 40%. In addition, it can be understood that, as to proportions of graphene of 10 layers or less, the Rate (3R) of the dispersion using Sample 3 is 38%, while the Rate (3R) of the dispersion using Sample 4 is 42%, and that, when the Rate (3R) reaches 40% or more, a proportion of graphene of 10 layers or less rapidly increases.

From these facts, it can be considered that graphene of 10 layers or less are easily exfoliated in cases where the Rate (3R) is 31% or more, and that, as the Rate (3R) increases to 40%, 50% and 60%, graphene of 10 layers or less are more easily exfoliated. In addition, focusing on the intensity ratio P1/P2, Samples 2 to 7 show values within a comparatively narrow range of 0.012 to 0.016, and any of them are preferable because they exceed 0.01 where it is considered that graphene is easily exfoliated since crystal structures will be deformed.

Figure 14:
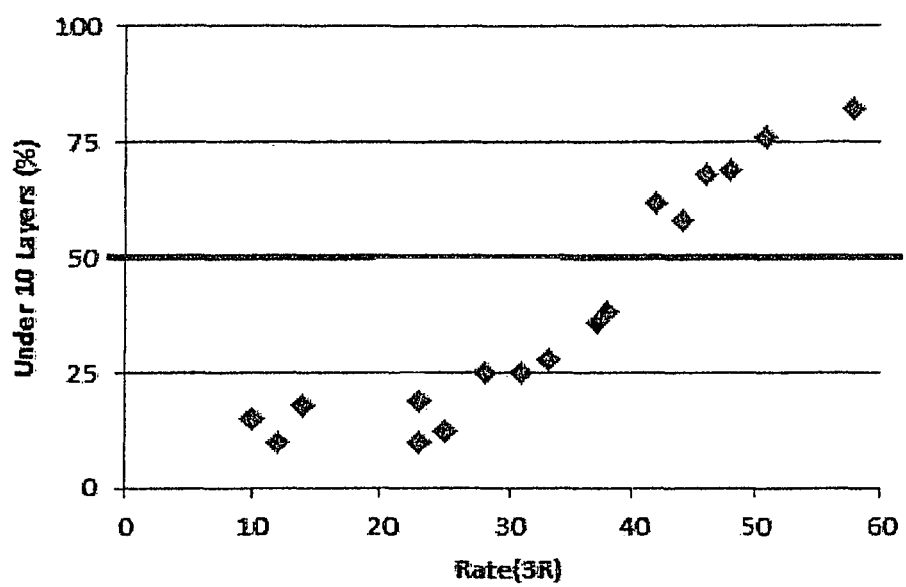
FIG. 14 is a diagram which shows proportions of graphene having 10 layers or less to a content of rhombohedral crystals dispersed in a dispersion.

Furthermore, results obtained by comparing Rates (3R) and proportions of graphene of 10 layers or less included therein are shown in FIG. 14. With reference to FIG. 14, it was revealed that, when the Rate (3R) reached 25% or more, around 31%, graphene of 10 layers or less started to increase (showing an ever-increasing slope). Further, it was revealed that, around 40%, graphene of 10 layers or less rapidly increased (as to proportions of graphene of 10 layers or less, whereas the Rate (3R) of the dispersion using Sample 3 was 38%, the Rate (3R) of the dispersion using Sample 4 was 62%, and the proportion of graphene of 10 layers or less rapidly increased by 24% as the Rate (3R) increased by 4%), and that a percentage of graphene of 10 layers or less against the total graphene was 50% or more. In addition, the points of black squares in FIG. 14 each correspond to different samples, and above-described Samples 1 to 7 and other samples are included therein.

From the facts, when a sample showing a Rate (3R) of 31% or more is used as a graphene precursor to produce a graphene dispersion, the proportion of distributed graphene of 10 layers or less starts increasing; further, when a sample showing a Rate (3R) of 40% or more is used as a graphene precursor to produce a graphene dispersion, 50% or more of graphene of 10 layers or less are produced. In other words, a graphene dispersion in which graphene is highly concentrated and highly dispersed can be obtained. Furthermore, because almost no graphite-based carbon materials (precursors) included in the dispersion deposit as described above, a concentrated graphene dispersion can easily be obtained. According to this method, even a graphene dispersion whose graphene concentration exceeded 10% can be produced without concentrating it. Particularly, the Rate (3R) is preferably 40% or more from a view point that the proportion of dispersed graphene of 10 layers or less sharply increases to 50% or more.

The above description clarifies the following: when the Rate (3R) is 31% or more, preferably 40% or more, and further preferably 50% or more, separation into graphene of 10 layers or less and thin graphite-based carbon materials of around 10 layers occurs in a greater proportion in many cases; and in the case where these graphite-based carbon materials are used as graphene precursors, a highly-concentrated graphene dispersion that has excellent dispersibility of graphene can be obtained, Still further, Example 5 to be described below clarifies that, in the case where the Rate (3R) is 31% or more, graphite-based carbon materials are useful as a graphene precursor.

Furthermore, an upper limit for the Rate (3R) is considered that the upper limit is not particularly defined. However, it is preferable that the upper limit is defined such that the intensity ratio P1/P2 simultaneously satisfies 0.01 or more, because graphene precursors are easily exfoliated when a dispersion or the like is produced. In addition, in cases of production methods using production apparatuses A and B, the upper limit is about 70%, from a viewpoint that graphene is easily produced. Also, a method combining a treatment based on the jet mill of the production apparatus A and a plasma treatment is more preferable, because a graphene precursor having a higher Rate (3R) can easily be obtained. Additionally, the Rate (3R) as long as it reaches 31% or more by combining the physical-force-based treatment and the radiowave-force-based treatment.

Example 2

In Example 1, a case where the ultrasonic treatment and the microwave treatment were combined for obtaining a graphene dispersion is explained. In Example 2, only an ultrasonic treatment was carried out while a microwave treatment was not carried out, and other conditions were the same as those for Example 1.

Figure 15A:
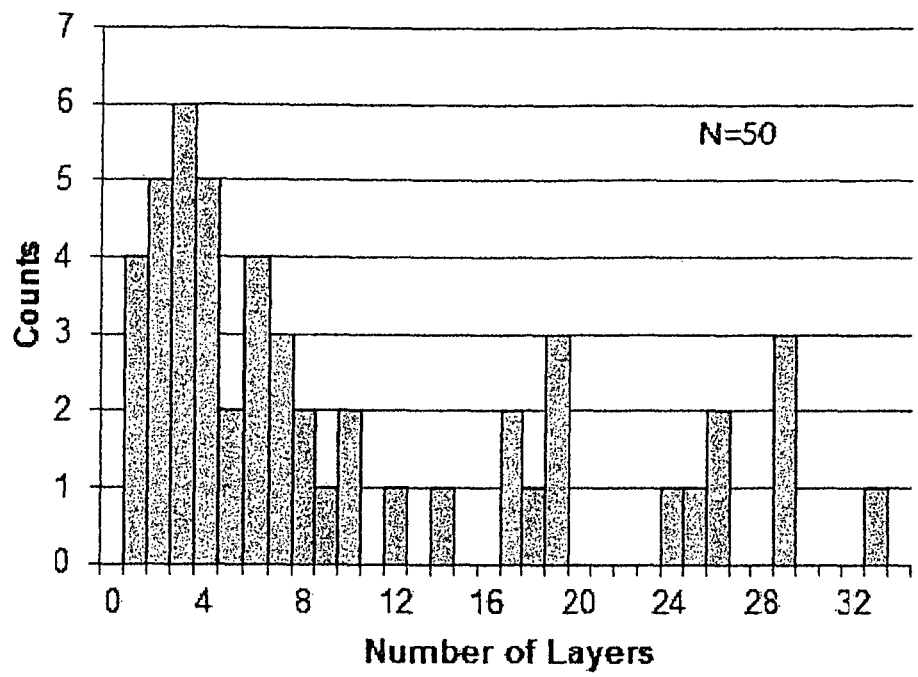
FIGS. 15(a) and 15(b) are figures which show a distribution state of graphite when varying conditions for producing a dispersion using a graphite-based carbon material (precursor) of Sample 5 according to Example 2, where
Figure 15B:
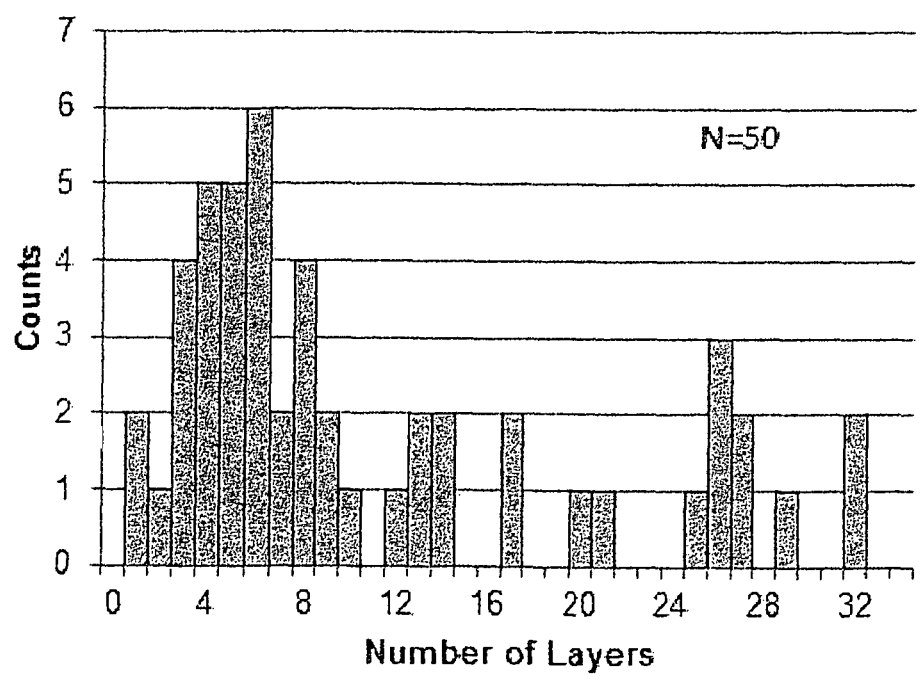
Figure 16:
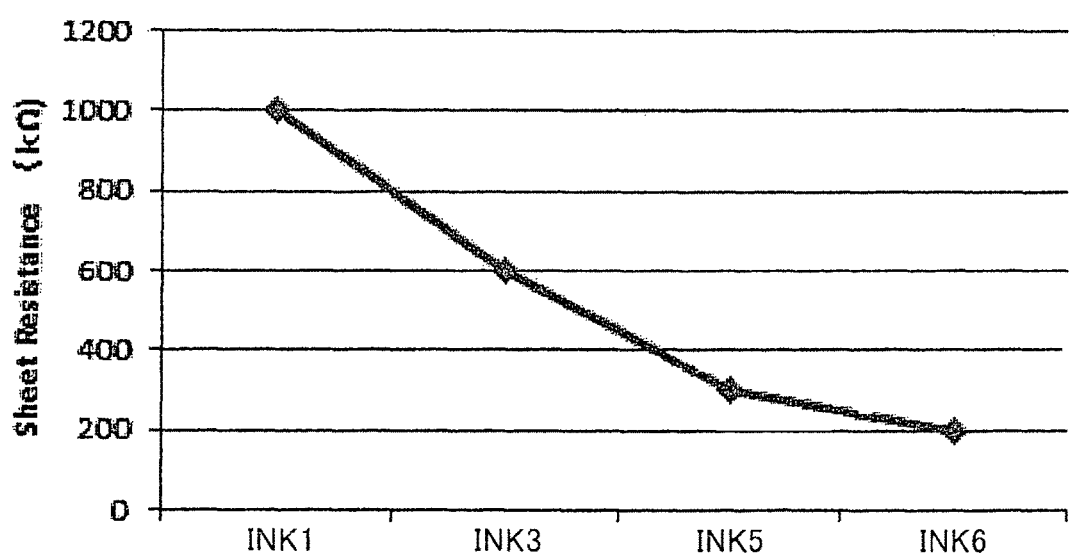
FIG. 16 is a diagram which shows a resistance value when a graphite-based carbon material of Example 3 was dispersed in a conductive ink.

FIG. 15 (b) shows a distribution of a number of layers with respect to a graphene dispersion which was obtained by carrying out an ultrasonic treatment using the graphene precursor of Sample 5 (Rate (3R)=46%) produced by the production apparatus B. In addition, FIG. 15 (a) is the same as the distribution shown in FIG. 11 (b) of Sample 5 produced by the production apparatus B of Example 1.

As a result, although the tendency of the distribution of the number of layers was almost similar, a proportion of graphene of 10 layers or less was 64%, and was slightly decreased, compared with 68% of Example 1. From the fact, it was revealed that it was more effective to simultaneously carry out two of the treatments based on a physical force and a radiowave force for producing a graphene dispersion.

Example 3

In Example 3, an example used for a conductive ink will be described.

Sample 1 (Rate (3R)=23%), Sample 3 (Rate (3R)=38%), Sample 5 (Rate (3R)=46%) and Sample 6 (Rate (3R)=51%) of Example 1 were used as graphene precursors in mixture solution of water and an alcohol of the carbon number of 3 or less, which severed as a conductivity-imparting agent, at concentrations adopted for conductive inks, thus producing INK1, INK3, INK5 and INK6, and their resistance values were compared. Based on the results, as the Rates (3R) became higher, the resistance values were lower.

Example 4

In Example 4, an example in which a graphene precursor was kneaded with a resin will be explained.

When a resin sheet, in which graphene was dispersed, was produced, the tensile strength was very superior although glass fibers were added thereto. Therefore, a factor for this was studied, and, consequently, a finding that a compatibilizer added simultaneously with the glass fibers contributed to formation of graphene from the precursor could be obtained. Therefore, products obtained by mixing dispersing agents and a compatibilizer into a resin were studied.

1 wt % of Sample 5 (Rate (3R)=46%) of Example 1 was added as a precursor directly to LLDPE (polyethylene), and the mixture was kneaded while applying shear (a shearing force) thereto with a kneader, two-shaft kneader (extruder) or the like.

It has been publicly known that, when a graphite-based carbon materials turned into graphene, being highly dispersed in a resin, the tensile strength increases. Therefore, by measuring a tensile strength of the resin, degrees of exfoliating into graphene and dispersion can relatively be estimated. The tensile strength was measured with an exact tabletop general-purpose testing machine (AUTOGRAPH AGS-J) manufactured by Shimadzu Corporation under a condition of test speed of 500 mm/min.

In addition, in order to compare degree of exfoliating into graphene and dispersibility depending on the presence or absence of additives, the following comparisons of three types of (a), (b) and (c) were carried out.
(a) No additives
(b) a general dispersing agent (zinc stearate)
(c) a compatibilizer (a graft-modified polymer)

Figure 17:
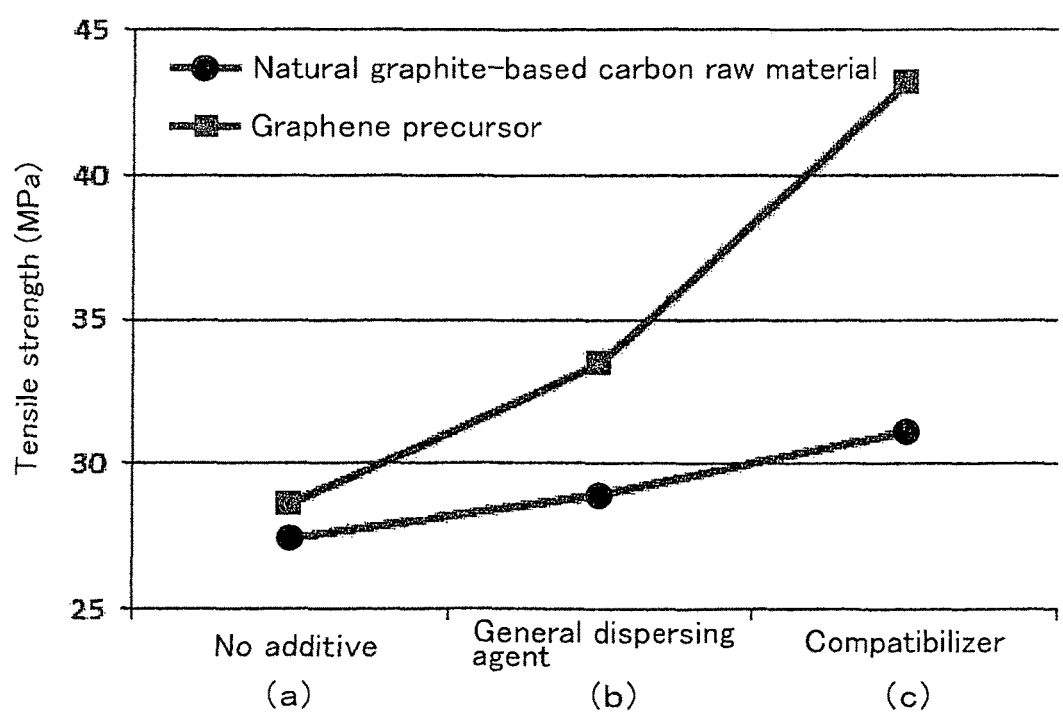
FIG. 17 is a diagram which shows a tensile strength when a graphite-based carbon material of Example 4 was kneaded with a resin.

With reference to FIG. 17 showing the measurement results, the results will be explained. In addition, in FIG. 17, circles refer to resin materials using Sample 1 of the comparative example, and squares refer to resin materials using Sample 5 of Example 1.

In case (a) where no additive was added, a difference of the tensile strengths was small.

In case (b) where the dispersing agent was added, it was revealed that formation of graphene was promoted to a certain degree in the graphene precursor of Sample 5.

In case (c) where the compatibilizer was added, it was revealed that that formation of graphene was significantly promoted in the graphene precursor of Sample 5. This is because it is considered that, besides effects to disperse graphene, the compatibilizer binds the graphene layer-bound bodies and the resin, and acts on them such that the graphene layer-bound bodies are stripped therefrom, when applying shear in that state.

Zinc stearate is explained above as an example of the dispersing agent. However, those suited for compounds may be selected. As examples of the dispersing agent, anionic (anion) surfactants, cationic (cation) surfactants, zwitterionic surfactants, and nonionic surfactants can be mentioned. In particular, anion surfactants and nonionic surfactants are preferable for graphene. Nonionic surfactants are more preferable. Since nonionic surfactants are surfactants which do not dissociate into ions and which show hydrophilic properties by hydrogen bonds with water, as observed in oxyethylene groups, hydroxyl groups, carbohydrate chains such as glucoside, and the like, there is a merit that they can be used in nonpolar solvents, although they do not have a strength of hydrophilicity as high as ionic surfactants. Further, this is because, by varying chain lengths of their hydrophilic groups, their properties can freely be changed from lipophilic properties to hydrophilic properties. As anionic surfactants, X acid salts (as for the X acid, for example, cholic acid, and deoxycholic acid), for example, SDC: sodium deoxycholate, and phosphate esters, are preferable. Furthermore, as nonionic surfactants, glycerol fatty acid esters, sorbitan fatty acid esters, fatty alcohol ethoxylates, polyoxyethylene alkyl phenyl ether, alkyl glycosides, and the like are preferable.

Example 5

In order to further verify that those obtained when the Rate (3R) is 31% or more are beneficial as graphene precursors, which is described above in Example 1, an example in which a graphene precursor was kneaded with a resin will be further explained in Example 5. The following explains elastic moduli of resin molded articles in which graphite-based carbon materials containing Samples 1 to 7 in Example 1, having Rates (3R) plotted in FIG. 14, were used as precursors.

(1) Using the above-described graphite-based carbon material as a precursor, 5 wt % of LLDPE (polyethylene: 20201J produced by Prime Polymer Co., Ltd.) and 1 wt % of a dispersant (nonionic surfactant) were mixed in an ion-exchanged water, and the above-described device illustrated in FIG. 8 was actuated under the same conditions, whereby graphene dispersions containing 5 wt % of graphene and graphite-based carbon materials were obtained.

(2) 0.6 kg of the graphene dispersion obtained in (1) was immediately kneaded into a resin of 5.4 kg using a kneader (pressing-type kneader WDS7-30 produced by Moriyama Co., Ltd.), whereby pellets were produced. The kneading conditions are to be described below. It should be noted that the mixing ratio between the resin and the dispersion was selected so that the amount of the graphene and graphite-based carbon materials mixed therein was eventually 0.5 wt %.

(3) The pellets produced in (2) were formed into a test piece according to JIS K7161 1A (length: 165 mm, width: 20 mm, thickness: 4 mm) by an injection molding machine.

(4) The elastic modulus (Mpa) of the test piece produced in (3) was measured under a condition of a test speed of 500 mm/min according to JIS K7161 by a table-top type precision universal tester produced by Shimadzu Corporation (AUTOGRAPH AGS-J).

The kneading conditions were as follows.
Kneading temperature: 135° C.
Rotor rotation speed: 30 rpm
Kneading time: 15 minutes
Pressurization in furnace: applying 0.3 MPa for 10 minutes after start, and depressurizing to atmospheric pressure after the 10 minutes elapsed Here, the dispersion of the above-described graphene dispersion into a resin is considered as follows. As the melting point of a resin is generally 100° C. or higher, water evaporates in atmosphere, but in a pressing-type kneader, the inside of a furnace can be pressurized. In the inside of the furnace, the boiling point of water is raised so that the dispersion is kept in a liquid form, whereby an emulsion of the dispersion and the resin can be obtained. After applying pressure for a predetermined time, the inside is gradually depressurized, which causes the boiling point of water to decrease, thereby allowing water to evaporate. Here, graphene confined in water are left in the resin. This causes graphene and graphite-based carbon materials to be dispersed at a high concentration in the resin.

Further, since the graphene and graphite-based carbon materials tend to precipitate in the graphene dispersion as time elapses, the graphene dispersion is kneaded into the resin preferably immediately after the graphene dispersion is obtained.

It should be noted that the following may be used as the means for obtaining the emulsion of the dispersion and the resin, other than the pressing kneader: a chemical thruster; a vortex mixer; a homomixer; a high-pressure homogenizer; a hydroshear; a flow jet mixer; a wet jet mill; and an ultrasonic generator.

Further, the following may be used as a solvent for the dispersion, other than water: 2-propanol (IPA); acetone; toluene; N-methylpyrrolidone (NMP); and N,N-dimethyl formamide (DMF).

Table 4 illustrates the relationship between the Rates (3R) of around 30% and the elastic moduli of resin molded articles. It should be noted that Sample 00 in Table 4 is a blank Sample in which no precursor was kneaded, Samples 11 and 12 have Rates (3R) between that of Sample 1 and that of Sample 2, and Sample 21 has a Rate (3R) between that of Sample 2 and that of Sample 3.

TABLE 4

| Sample No. | 00 | 1 | 11 | 12 | 2 | 21 | 3 | 4 |
|---|---|---|---|---|---|---|---|---|
| P3/(P3 + P4) | — | 23% | 25% | 28% | 31% | 35% | 38% | 42% |
| Elastic modulus (MPa) (Average in 5 times) | 175 | 197 | 196 | 199 | 231 | 249 | 263 | 272 |

TABLE 4-continued

| Sample No. | 00 | 1 | 11 | 12 | 2 | 21 | 3 | 4 |
|---|---|---|---|---|---|---|---|---|
| Difference from blank | — | 12.4% | 12.0% | 13.9% | 31.7% | 42.1% | 50.0% | 55.6% |
| Under-10 layers upon dispersion in NMP (Reference) | — | 10% | 12% | 25% | 25% | 30% | 38% | 62% |

Figure 18:
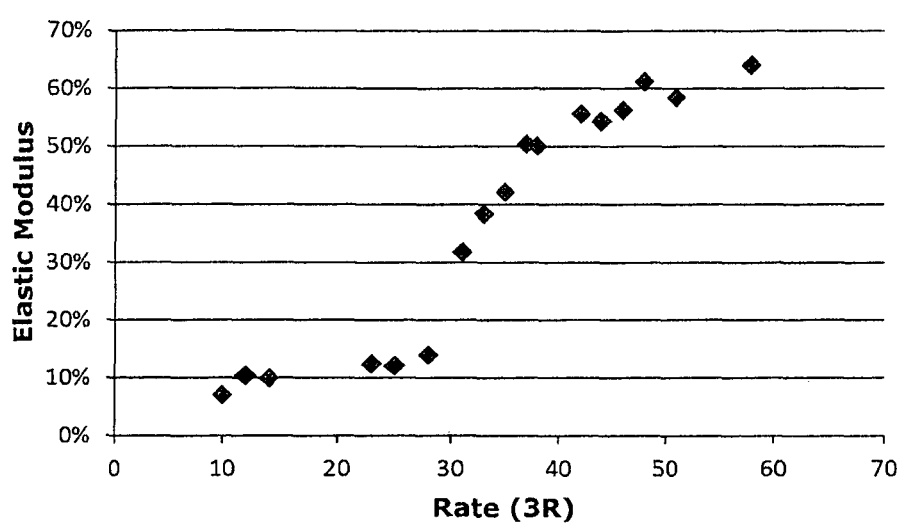
FIG. 18 is a diagram which shows a tensile strength when a graphite-based carbon material of Example 5 was kneaded with a resin.

FIG. 18 and Table 4 prove that the difference of the elastic modulus with respect to that of Sample 00 (blank) (increase ratio of the elastic modulus) is approximately uniform around 10% until the Rate (3R) reaches 31%; after the Rate (3R) reaches 31%, the difference sharply increases to 32%; while the Rate (3R) increases from 31% to 42%, the difference monotonously increases to 50%; and after the Rate (3R) reaches 42%, the difference slightly increases and converges to around 60%. In this way, when the Rate (3R) is 31% or more, a resin molded article having an excellent elastic modulus can be obtained. Further, since the amount of graphene and graphite-based carbon materials contained in a resin molded article is 0.5 wt %, which is small, influence on properties that the resin originally possesses is small.

Figure 19A:
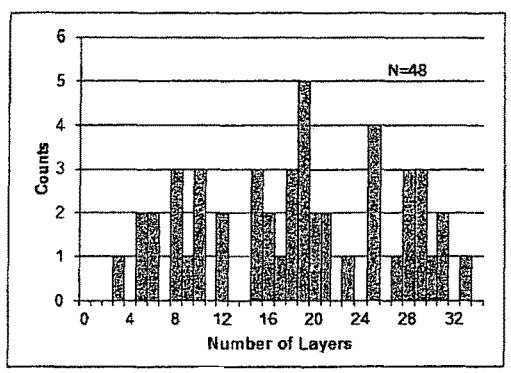
FIGS. 19(a) and 19(b) are diagrams which show dispersing states of graphite-based carbon materials of dispersions for describing dispersing states of Example 5 supplementary, where
Figure 19B:
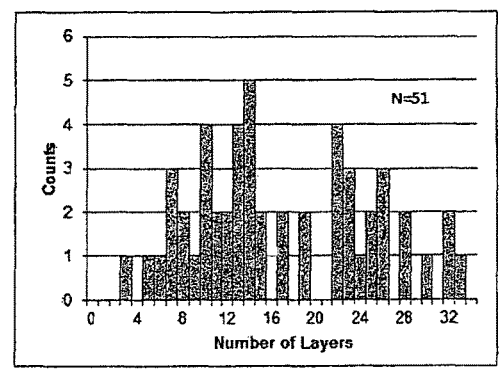

It is considered that this tendency attributes to a sharp increase in a thin graphite-based carbon material containing graphene having 10 or less layers in contact with a resin after the Rate (3R) reaches 31%. Here, in Example 5, it is impossible to determine the number of layers of graphene by observation with TEM due to influences of a dispersant used for dispersion in water. Then, only for reference, the reason for the sharp increase described above is considered based on the distribution of the numbers of layers of the graphite-based carbon material illustrated in Table 4 upon dispersion in NMP. Sample 12 and Sample 2 are compared with each other, and it is found that both of the proportions of graphene (the number of layers are 10 or less) were 25%. On the other hand, as illustrated in FIGS. 19(a) and 19(b), as to Sample 2, the proportion of thin ones having less than 15 layers was greater as compared with Sample 12; in other words, the graphite-based carbon material dispersed as a precursor had a larger surface area, which means that the area thereof in contact with the resin sharply increased.

In this way, Example 5 clearly indicates that when the Rate (3R) is 31% or more, a graphite-based carbon material used as a graphene precursor tends to be separated into graphene having 10 or less layers and a thin graphite-based carbon material.

Moreover, in above-described examples 1 to 5, the production apparatus A using a jet mill and plasma and the production apparatus B using a ball mill and microwaves are described as a production apparatus which produces a graphene precursor. When a treatment based on a radiowave force such as by microwaves, millimeter waves, plasma, electromagnetic induction heating (IH), and magnetic fields, and a treatment based on a physical force such as by a ball mill, a jet mill, centrifugal force, and supercriticality are combined for use, a precursor having a high Rate (R3) can be obtained. Therefore, such combination of the treatments is preferable. Additionally, as long as the radiowave force-based treatments and the physical force-based treatments are used in combination, there is no restriction on a specific kind of the radiowave force-based treatments or the physical force-based treatments to be applied. In particular, as exemplified in the production apparatuses A and B, it is preferable that effects based on the radiowave force and the physical force are simultaneously exerted. However, the radiowave force and the physical force may be alternately exerted at predetermined intervals. Moreover, as for the radiowave force, different radiowave forces, such as treatments based on microwaves and plasma, may be alternately exerted, and, in parallel with the treatments, one or more treatments based on the physical forces may be exerted. Conversely, as for the physical force, different physical forces, such as treatments based on a jet mill and supercriticality, may be alternately exerted, and, in parallel with the treatments, one or more treatments based on the radiowave forces may be exerted.

Moreover, in above-described examples, the production apparatus using microwaves and ultrasonic waves is described as a production apparatus for obtaining a graphene dispersion using a precursor. However, when a treatment based on a radiowave force such as by microwaves, millimeter waves, plasma, electromagnetic induction heating (IH) and magnetic fields, and a treatment based on a physical force such as by ultrasonic waves, a ball mill, a jet mill, centrifugal force, and supercriticality are combined, a graphene dispersion having a high graphene concentration can be obtained. Therefore, such combination of the treatments is preferable. In particular, as seen in the production apparatus, it is preferable that effects based on a radiowave force and a physical force are simultaneously directed thereto. However, a radiowave force and a physical force may alternately be directed thereto at predetermined intervals.

Furthermore, in the above-described examples, graphene dispersions, conductive inks and resin molded articles are described as applications using precursors. However, also, by mixing, as base materials, precursors into composite base materials such as monomers, polymers, other carbon materials, ceramics, woods, cements or metals, graphene composite may be obtained. That is, in the present specification, a graphene composite means products encompassing the above-described graphene dispersions, conductive inks and resin molded articles. Additionally, a graphene dispersion encompasses paste products with high viscosities.

As examples of liquids or base materials for dispersing precursors, the following materials can be mentioned. Resins includes polyethylene (PE), polypropylene (PP), polystyrene (PS), polyvinyl chloride (PVC), ABS resins (ABS), acrylic resins (PMMA), polyimide/nylon (PA), polyacetal (POM), polycarbonate (PC), polyethylene terephthalate (PET), cyclic polyolefins (COP), polyphenylene sulfide (PPS), polytetrafluoroethylene (PTFE), polysulfones (PSF), polyamide-imide (PAT), thermoplastic polyimide (PI), polyether ether ketone (PEEK), and liquid-crystal polymers (LCP). In addition, among synthetic resins, as thermosetting resins, thermoplastic resins such as epoxy resins (EP), phenolic resins (PF), melamine resins (MF), polyurethanes (PUR) and unsaturated polyester resins (UP) can be mentioned; fibrous nylon, and fibers of polyester, acryl, vinylon, polyolefin, polyurethane, rayon or the like can be mentioned; as elastomers, isoprene rubbers (IR), butadiene rubbers (BR), styrene/butadiene rubbers (SBR), chloroprene rubbers (CR), nitrile rubbers (NBR), polyisobutylene rubbers/butyl rubbers (IIR), ethylene propylene rubbers (EPM/EPDM), chlorosulfonated polyethylene (CSM), acrylic rubbers (ACM), epichlorohydrin rubbers (CO/ECO), and the like can be mentioned; as thermosetting resin-based elastomers, some urethane rubbers (U), silicone rubbers (Q), fluorine-containing rubbers (FKM), and the like can be mentioned; and, as thermoplastic elastomers, elastomers based on styrene, olefin, polyvinyl chloride, urethane, or amide can be mentioned.

Moreover, as mineral oils, lubricating oils, and greases can be mentioned, and, as compounded oils for rubbers, paraffin-based mineral oils, naphthenic mineral oil, aromatic mineral oils, and the like can be mentioned.

Furthermore, as nonpolar products, hexane, benzene, toluene, chloroform, ethyl acetate, and the like can be mentioned; as polar aprotic products, acetone, N,N-dimethylformamide (DMF), N-methylpyrrolidone (NMP), acetonitrile, and the like can be mentioned; and, as polar protic products, acetic acid, ethanol, methanol, water, 1-butanol, 2-propanol, formic acid, and the like can be mentioned.

In addition, as an example of natural graphite for producing a graphite-based carbon material useful as a graphene precursor, particles of 5 mm or less of a natural graphite material (flaky graphite ACB-50 manufactured by Nippon Graphite Industries, ltd.) is described above. However, as for the natural graphite, products which are flaky graphite, being pulverized into 5 mm or less, and which have a Rate (3R) of less than 25% and an intensity ratio P1/P2 of less than 0.01 are preferable, from a viewpoint that they are easily-available.

INDUSTRIAL APPLICABILITY

The following can be mentioned as products for attempting functionalization according to graphene by adding the precursor to objects.

Additives for polymer materials such as resins, rubbers, or coatings

Additives for heat radiation sheets, conductive sheets, heat radiation tapes, or conductive tapes Sintered metallurgy obtained by adding the precursor to metal powder, followed by sintering Additives for ceramics such as lithium oxide or nanoclay Additives for nonmetals such as concrete, or non-polymer materials The following can be mentioned as products using graphene dispersions.

Electrode agents, conductive auxiliaries, discharge capacity-improving agents, charge/discharge efficiency-improving agents for lithium-ion batteries Electrodes or electrolyte solutions for capacitor products Conductive agents for conductive inks

REFERENCE SIGNS LIST

1 a natural graphite material
4 a jet mill
7 a plasma generator
16 a graphite-based carbon material useful as a graphene precursor
20 a ball mill
21 a microwave generator
24 a media
25 a natural graphite material
28 a graphite-based carbon material useful as a graphene precursor
30 a graphene dispersion using Sample 5
31 a graphene dispersion using Sample 1
33 a flake
40 a beaker
41 a graphene dispersion
43 a microwave generator
44 an ultrasonic wave generator

The invention claimed is:

1. A method of producing a graphene composite, comprising a step of mixing at least a graphite-based carbon material in a base material, wherein graphene is partially exfoliated from the graphite-based carbon material and dispersed in the base material, the graphite-based carbon material having, just before the mixing step, a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1, is 31% or more:

$$\text{Rate}(3R) = P3/(P3+P4) \times 100 \qquad \text{(Equation 1)}$$

wherein

P3 is a peak intensity of a (101) plane of the rhombohedral graphite layer (3R) based on the X-ray diffraction method, and P4 is a peak intensity of a (101) plane of the hexagonal graphite layer (2H) based on the X-ray diffraction method, the graphene being a crystal of a mean size of 100 nm or more and formed in a flake-like or sheet-like shape having 10 layers or less.

2. The method of producing a graphene composite according to claim 1, wherein:

the base material is a resin;

the mixing step involves kneading while applying shearing force; and the graphene composite is a resin molded article.

3. The method of producing a graphene composite according to claim 2, wherein a compatibilizer is added and kneaded in the base material in the mixing step.

4. The method of producing a graphene composite according to claim 1, wherein the graphene composite is conductive ink.

5. The method of producing a graphene composite according to claim 4, wherein the base material is at least one of a solvent and a conductivity-imparting agent.

* * * * *